(12) United States Patent
Araki et al.

(10) Patent No.: US 9,256,221 B2
(45) Date of Patent: Feb. 9, 2016

(54) INFORMATION PROCESSING APPARATUS, PROCESSING SYSTEM, PROCESSING METHOD, AND PROGRAM

(71) Applicant: TOKYO ELECTRON LIMITED, Minato-ku (JP)

(72) Inventors: Shinichiro Araki, Koshi (JP); Katsuhiko Matsuda, Fuchu (JP); Kiminori Okada, Nirasaki (JP); Taichi Ito, Fuchu (JP); Susumu Nakajima, Fuchu (JP); Nobuhiro Horiuchi, Nirasaki (JP)

(73) Assignee: TOKYO ELECTRON LIMITED, Minato-ku (JP)

( * ) Notice: Subject to any disclaimer, the term of this patent is extended or adjusted under 35 U.S.C. 154(b) by 239 days.

(21) Appl. No.: 14/040,783

(22) Filed: Sep. 30, 2013

(65) Prior Publication Data

US 2014/0032151 A1    Jan. 30, 2014

Related U.S. Application Data

(63) Continuation of application No. PCT/JP2012/053603, filed on Feb. 16, 2012.

(30) Foreign Application Priority Data

Mar. 29, 2011    (JP) .................................. 2011-072935

(51) Int. Cl.
*G01N 37/00* (2006.01)
*G05B 19/418* (2006.01)

(52) U.S. Cl.
CPC ................................ *G05B 19/41875* (2013.01)

(58) Field of Classification Search
CPC .................................................. G05B 19/41875
USPC ........................................................... 702/81
See application file for complete search history.

(56) References Cited

U.S. PATENT DOCUMENTS 6,963,786 B2 * 11/2005 Ogushi ............... G03F 7/70525
700/108

2002/0013908 A1 * 1/2002 Nishihata ............ G06F 21/6218
726/25

(Continued)

FOREIGN PATENT DOCUMENTS

JP          2706793 B       10/1997
JP       2000-090161 A       3/2000

(Continued)

OTHER PUBLICATIONS

International Search Report issued Apr. 24, 2012, in PCT Application No. PCT/JP2012/053603, filed Feb. 16, 2012.

*Primary Examiner* — Tung S Lau
*Assistant Examiner* — Xiuquin Sun
(74) *Attorney, Agent, or Firm* — Oblon, McClelland, Maier & Neustadt, L.L.P.

(57) ABSTRACT

An information processing apparatus for processing information on semiconductor treatment apparatus includes an abnormality information display device which displays information on an abnormality in semiconductor treatment apparatus, a countermeasure information receiving device which receives countermeasure information on countermeasure, a countermeasure information storing device which stores the countermeasure information matched with abnormality identification information, an output device which outputs the countermeasure and abnormality identification information via communication device to outside, a countermeasure item display device which displays countermeasure item candidates, a countermeasure item storing device which stores countermeasure item selected from the candidates matched with the abnormality identification information, a countermeasure item transmitting device which transmits the countermeasure item and abnormality identification information via the communication device to outside, a countermeasure item statistic receiving device which receives statistic regarding the countermeasure item corresponding to the abnormality identification information from outside, and a countermeasure item statistic display device which displays the statistic.

17 Claims, 38 Drawing Sheets

(56) References Cited

U.S. PATENT DOCUMENTS

| | | | |
|---|---|---|---|
| 2003/0004656 A1* | 1/2003 | Bjornson | G05B 23/0278 702/34 |
| 2003/0028268 A1* | 2/2003 | Eryurek | G05B 17/02 700/73 |
| 2004/0176868 A1* | 9/2004 | Haga | G05B 19/418 700/121 |

FOREIGN PATENT DOCUMENTS

| | | |
|---|---|---|
| JP | 2002-163295 A | 6/2002 |
| JP | 2003-099501 A | 4/2003 |
| JP | 2005-339571 A | 12/2005 |
| JP | 2009-217457 A | 9/2009 |
| TW | 583522 | 4/2004 |
| TW | I246708 | 1/2006 |

* cited by examiner

ABNORMALITY FILE 251

| ABNORMAL-ITY ID | ABNORMALITY INFORMATION |
|---|---|
| 1001 | 1ST SENSOR OF STAGE IS … |
| 1002 | 2ND SENSOR OF STAGE IS … |
| ⋮ | ⋮ |
| 2003 | 3RD SENSOR OF GAS SUPPLY SECTION IS… |
| ⋮ | ⋮ |

ABNORMALITY HISTORY FILE 253

| OCCURRENCE DATE/TIME | ABNORMALITY ID |
|---|---|
| 2010/9/16/12:55:20 | 1001 |
| 2010/9/16/13:15:30 | 1002 |
| ⋮ | ⋮ |

FIG. 6

```
SELECT ABNORMALITY FOR INPUTTING
COUNTERMEASURE INFORMATION

OCCURRENCE              ABNORMALITY    SELECT
   DATE/TIME               ID
   2010/9/16/12:55:20      1001           ☐
   2010/9/16/13:15:30      1002           ☐

OK          CANCEL
```

FIG. 7

```
COUNTERMEASURE INFORMATION INPUT SCREEN

OCCURRENCE DATE/TIME: 2010/9/16/12:55:20

ABNORMALITY ID: 1001

ABNORMALITY INFORMATION: 1ST SENSOR OF STAGE DOES NOT RESPOND

USER ID: X001                                              242
COUNTER-
MEASURE INFO:
    ABNORMALITY OCCURRED DUE TO CABLE DISCONNECTION. ABNORMALITY
    WAS RECOVERED BY REPLACING CABLE. CABLE NUMBER IS C001.
    WHEN MOTOR IS NOT OPERATED OFTEN, FIRST, RETRY SEVERAL TIMES.
    THEN, INSPECT BAD CONTACT CAUSED BY CONNECTOR REMOVAL OR
    DISCONNECTION. CONFIRMATION MAY BE PERFORMED BY CHECKING
    VOLTAGE OR CONDUCTION USING TESTER, CHECKING DISCONNECTION
    THROUGH VISUAL INSPECTION, OR CHECKING CONTACT OF CONNECTOR.
    FOR CIRCUIT DIAGRAM, REFER TO APPARATUS MANUAL, PAGE 103.

OK          CANCEL
```

COUNTERMEASURE INFORMATION FILE 252

| OCCURRENCE DATE/TIME | ABNORMAL-ITY ID | COUNTER-MEASURE ID | COUNTER-MEASURE INFO | USER ID |
|---|---|---|---|---|
| 2010/9/16/12:55:20 | 1001 | N1001 | ... | X001 |
| 2010/9/18/12:35:50 | 2001 | N2001 | ... | X003 |
| ⋮ | ⋮ | ⋮ | ⋮ | ⋮ |

APPARATUS DB 151

| COMPUTER ID | FILM-FORMING APPARATUS ID | ADDRESS |
|---|---|---|
| P001 | D001 | ... |
| P002 | D002 | ... |
| ⋮ | ⋮ | ⋮ |

FIG. 11

COUNTERMEASURE INFORMATION DB 152

| OCCURRENCE DATE/TIME | ABNORMAL-ITY ID | COUNTER-MEASURE ID | COUNTERMEASURE INFO | USER ID | COMPUTER ID |
|---|---|---|---|---|---|
| 2010/9/16/12:55:20 | 1001 | N1001 | ... | X001 | P001 |
| 2010/9/18/12:35:50 | 2001 | N2001 | ... | X003 | P001 |
| 2010/9/20/13:55:45 | 1001 | N1008 | ... | X008 | P002 |
| ... | ... | ... | ... | ... | ... |

FIG. 12

```
COUNTERMEASURE INFORMATION

OCCURRENCE DATE/TIME: 2010/9/30/15:35:20
ABNORMALITY ID: 1001
ABNORMALITY INFORMATION: 1ST SENSOR OF STAGE
DOES NOT RESPOND

COUNTERMEASURE ID: N1001
COUNTERMEASURE INFORMATION:
  ABNORMALITY OCCURRED DUE TO DISCONNECTION OF
CABLE...

COUNTERMEASURE ID: N1008
COUNTERMEASURE INFORMATION:...

[ OK ]    [ CANCEL ]
```

FIG. 17

ABNORMALITY FILE 251

| ABNORMA-LITY ID | ABNORMA-LITY INFO | COUNTERMEASURE ITEM | | | CAUSE OF ABNORMALITY |
|---|---|---|---|---|---|
| | | RETRY | PROCESSING CONTINUED | RESTART | |
| 1001 | ... | • | • | • | DESIGN FAILURE, PARTS BREAKDOWN |
| 1002 | ... | • | • | • | DESIGN FAILURE, ADJUSTMENT FAILURE |
| ... | ... | ... | ... | ... | ... |
| 2003 | ... | • | • | • | DESIGN FAILURE, PARTS BREAKDOWN |
| ... | ... | ... | ... | ... | ... |

FIG. 18

```
ABNORMALITY INFORMATION DISPLAY

ABNORMALITY ID: 1001
ABNORMALITY INFORMATION: 1ST SENSOR OF STAGE
DOES NOT RESPOND
OCCURRENCE DATE/TIME: 2010/9/16/12:55:20

IN CASE OF "RETRY", PERFORM STAGE LIFT OPERATION
AGAIN.

IN CASE OF "PROCESSING CONTINUED", CONTINUE
PROCESSING BY REMOVING WAFER

IN CASE OF "RESTART", SET FILM-FORMING APPARATUS
IN POWER-ON STATE

COUNTERMEASURE ITEM
   ┌─────────┐  ┌────────────┐  ┌─────────┐
   │  RETRY  │  │ PROCESSING │  │ RESTART │
   │         │  │ CONTINUED  │  │         │
   └─────────┘  └────────────┘  └─────────┘
   ┌──────────────────────────┐
   │ DISPLAY COUNTERMEASURE   │
   │ INFORMATION              │
   └──────────────────────────┘
           ↘ 241
```

FIG. 19

COUNTERMEASURE INFORMATION FILE 252

| OCCURRENCE DATE/TIME | ABNORMA-LITY ID | COUNTER-MEASURE ID | COUNTER MEASURE INFO | USER ID | COUNTER-MEASURE ITEM | SENSOR DATA |
|---|---|---|---|---|---|---|
| 2010/9/16/12:55:20 | 1001 | N1001 | ... | X001 | RETRY | ... |
| 2010/9/18/12:35:50 | 2001 | N2001 | ... | X003 | RESTART | ... |
| ... | ... | ... | ... | ... | ... | ... |

| MANUPULA-TION DATA | CAUSE OF ABNORMALITY | REPLACEMENT PART ID |
|---|---|---|
| ... | DESIGN FAILURE | N/A |
| ... | PARTS BREAKDOWN | 300 |
| ... | ... | ... |

FIG. 20

```
COUNTERMEASURE INFORMATION INPUT SCREEN

OCCURRENCE DATE/TIME: 2010/9/16/12:55:20
ABNORMALITY ID: 1001
ABNORMALITY INFORMATION: FIRST SENSOR OF STAGE DOES NOT RESPOND

USER ID: X001                                          ~242
COUNTER-
MEASURE INFO:
    ABNORMALITY OCCURRED DUE TO CABLE DISCONNECTION.  ABNORMALITY
    WAS RECOVERED BY REPLACING CABLE.  CABLE NUMBER IS C001.
    WHEN MOTOR IS NOT OPERATED OFTEN, FIRST, RETRY SEVERAL TIMES.
    THEN, INSPECT BAD CONTACT CAUSED BY CONNECTOR REMOVAL OR
    DISCONNECTION.  CONFIRMATION MAY BE PERFORMED BY CHECKING
    VOLTAGE OR CONDUCTION USING TESTER, CHECKING DISCONNECTION
    THROUGH VISUAL INSPECTION, OR CHECKING CONTACT OF CONNECTOR.
    FOR CIRCUIT DIAGRAM, REFER TO APPARATUS MANUAL, PAGE 103.

REPLACEMENT PART ID: 300

CAUSE OF ABNORMALITY

☐ 1. DESIGN         ☐ 2. MECHANICAL PART   ☐ 3. ELECTRIC PART
       FAILURE             FAILURE                FAILURE
  ☐ 4. PART           ☐ 5. REPLACE           ☐ 6. SOFTWARE BUG
       BREAKDOWN           EXPANDABLES

☐ ATTACH MANIPULATION DATA

SETUP DATA    ABNORMALITY DATA

☐ ATTACH FIRST SENSOR DATA          ...              ...

☐ ATTACH SECOND SENSOR DATA         ...              ...

☐ ATTACH THIRD SENSOR DATA          ...              ...

[  OK  ]    [ CANCEL ]
```

FIG. 21

COUNTERMEASURE INFORMATION DB 152

| OCCURRENCE DATE/TIME | ABNORMAL-ITY ID | COUNTER-MEASURE ID | COUNTERME-ASURE INFO | USER ID | COUNTER-MEASURE ITEM | SENSOR DATA |
|---|---|---|---|---|---|---|
| 2010/9/16/12:55:20 | 1001 | N1001 | ... | X001 | RETRY | ... |
| 2010/9/18/12:35:50 | 2001 | N2001 | ... | X003 | RESTART | ... |
| ... | ... | ... | ... | ... | ... | ... |

| MANIPULA-TION DATA | CAUSE OF ABNORMALITY | REPLACEMENT PART ID | COMPUTER ID |
|---|---|---|---|
| ... | DESIGN FAILURE | N/A | ... |
| ... | PART BREAKDOWN | 300 | ... |
| ... | ... | ... | ... |

FIG. 25

STATISTIC DB 153

| ABNORMALITY ID | COUNTER-MEASURE ITEM | NUMBER OF EVENTS | PERCENTAGE (%) | CAUSE OF ABNORMALITY | NUMBER OF EVENTS | PERCENTAGE (%) |
|---|---|---|---|---|---|---|
| 1001 | RETRY | ... | ... | DESIGN FAILURE | ... | ... |
| | PROCESSING CONTINUED | ... | ... | MECHANICAL PART FAILURE | ... | ... |
| | RESTART | ... | ... | ELECTRICAL PART FAILURE | ... | ... |
| | ... | ... | ... | ... | ... | ... |
| 1002 | | | | | | |

FIG. 26

```
COUNTERMEASURE INFORMATION

OCCURRENCE DATE/TIME: 2010/9/30/15:35:20

ABNORMALITY ID: 1001

ABNORMALITY INFORMATION: FIRST SENSOR OF STAGE DOES NOT RESPOND

STATISTIC

COUNTERMEASURE ITEM: 「RETRY  X EVENTS O%」 「PROCESSING CONTINUED X EVENTS O%」 「RESTART
X EVENTS O%」
CAUSE OF ABNORMALITY: 「DESIGN FAILURE X EVENTS O%」 「MECHANICAL PART X EVENTS O%」
「ELECTRICAL PART X EVENTS O%」 ・・・
REPLACEMENT PART ID: N1001
COUNTERMEASURE INFORMATION: ABNORMALITY OCCURED DUE TO DISCONNECTION OF CABLE ・・・
REPLACEMENT PART ID: 300
MANIPULATION DATA: ・・・

SETUP DATA    ABNORMALITY DATA
FIRST SENSOR DATA      ・・・            ・・・
SECOND SENSOR DATA     ・・・            ・・・
THIRD SENSOR DATA      ・・・            ・・・

COUNTERMEASURE ID: N1008
COUNTERMEASURE INFORMATION ・・・

OK      CANCEL
```

FIG. 29

```
COUNTERMEASURE INFORMATION INPUT SCREEN
OCCURRENCE DATE/TIME: 2010/9/16/12:55:20
ABNORMALITY ID: 1001
ABNORMALITY INFORMATION: FIRST SENSOR OF STAGE DOES NOT RESPOND

USER ID X001                                              242
COUNTERMEASURE
INFORMATION:
   ABNORMALITY OCCURRED DUE TO CABLE DISCONNECTION.
   ABNORMALITY WAS RECOVERED BY REPLACING CABLE. CABLE NUMBER
   IS C001. WHEN MOTOR IS NOT OPERATED OFTEN, FIRST, RETRY
   SEVERAL TIMES. THEN, INSPECT BAD CONTACT CAUSED BY
   CONNECTOR REMOVAL OR DISCONNECTION. CONFIRMATION MAY BE
   PERFORMED BY CHECKING VOLTAGE OR CONDUCTION USING TESTER,
   CHECKING DISCONNECTION THROUGH VISUAL INSPECTION, OR
   CHECKING CONTACT OF CONNECTOR. FOR CIRCUIT DIAGRAM, REFER
   TO APPARATUS MANUAL, PAGE 103.

PRESERVATION  ☐ PERMANENT ☐ UNTIL YEAR MONTH DATE  ☐ NUMBER OF
PERIOD                                                MONTHS
REPLACEMENT PART ID: 300

CAUSE OF ABNORMALITY

☐ 1. DESIGN        ☐ 2. MECHANICAL PART   ☐ 3. ELECTRIC PART
       FAILURE            FAILURE                FAILURE

☐ 4. PART          ☐ 5. REPLACE EXPANDABLES ☐ 6. SOFTWARE BUG
       BREAKDOWN

☐ ATTACH MANIPULATION DATA

SETUP DATA    ABNORMALITY DATA

☐ ATTACH FIRST SENSOR DATA         ...              ...

☐ ATTACH SECOND SENSOR DATA        ...              ...

☐ ATTACH THIRD SENSOR DATA         ...              ...

[  O K  ]     [ CANCEL ]
```

FIG. 30

COUNTERMEASURE INFORMATION FILE 252

| OCCURRENCE DATE/TIME | ABNORMALITY ID | COUNTER-MEASURE ID | COUNTERMEASURE INFO | USER ID | COUNTER-MEASURE ITEM | SENSOR DATA |
|---|---|---|---|---|---|---|
| 2010/9/16/12:55:20 | 1001 | N1001 | ... | X001 | RETRY | ... |
| 2010/9/18/12:35:50 | 2001 | N2001 | ... | X003 | RESTART | ... |
| ... | ... | ... | ... | ... | ... | ... |

| MANIPULATION DATA | CAUSE OF ABNORMALITY | REPLACEMENT PART ID | PRESERVATION PERIOD |
|---|---|---|---|
| ... | DESIGN FAILURE | N/A | PERMANENT |
| ... | PART BREAKDOWN | 300 | UNTIL 2011/9/16/12:55:20 |
| ... | ... | ... | ... |

FIG. 31

COUNTERMEASURE INFORMATION DB 152

| OCCURRENCE DATE/TIME | ABNORMALITY ID | COUNTER-MEASURE ID | COUNTERMEA-SURE INFO | USER ID | COUNTER-MEASURE ITEM | SENSOR DATA |
|---|---|---|---|---|---|---|
| 2010/9/16/12:55:20 | 1001 | N1001 | ... | X001 | RETRY | ... |
| 2010/9/18/12:35:50 | 2001 | N2001 | ... | X003 | RESTART | ... |
| ... | ... | ... | ... | ... | ... | ... |

| MANIPULATION DATA | CAUSE OF ABNORMALITY | REPLACEMENT PART ID | PRESERVATION PERIOD | COMPUTER ID |
|---|---|---|---|---|
| ... | DESIGN FAILURE | N/A | PERMANENT | ... |
| ... | PART BREAKDOWN | 300 | UNTIL 2011/9/16/12:55:20 | ... |
| ... | ... | ... | ... | ... |

FIG. 33

ABNORMALITY FILE 251

| ABNORMALITY ID | ABNORMALITY INFORMATION | COUNTERMEASURE ITEM | | | EXECUTION COMMAND | | |
|---|---|---|---|---|---|---|---|
| | | RETRY | PROCESSING CONTINUED | RESTART | RETRAY | PROCESSING CONTINUED | RESTART |
| 1001 | ... | ... | ... | ... | ... | ... | ... |
| 1002 | ... | ... | ... | ... | ... | ... | ... |
| ... | ... | ... | ... | ... | ... | ... | ... |

FIG. 35

APPARATUS DB 151

| COMPUTER ID | FILM-FORMING APPARATUS ID | ADDRESS | CLASSIF-ICATION | INSTALLATION YR/MO/DATE | OPERATING TIME |
|---|---|---|---|---|---|
| P0001 | D001 | ... | A | ... | ... |
| P0002 | D002 | ... | A | ... | ... |
| P0003 | F001 | ... | B | ... | ... |
| P0004 | D002 | ... | A | ... | ... |
| ⋮ | ⋮ | ⋮ | ⋮ | ⋮ | ⋮ |

FIG. 36

WARNING INFORMATION: FOLLOWING ABNORMALITY MAY OCCUR SOON
ABNORMALITY ID: 1001
ABNORMALITY INFORMATION: FIRST SENSOR OF STAGE DOES NOT RESPOND

COUNTERMEASURE ID: N001
COUNTERMEASURE INFORMATION: ABNORMALITY OCCURRED DUE TO DISCONNECTION OF CABLE・・・

COUNTERMEASURE ID: N008
COUNTERMEASURE INFORMATION:・・・

FOR MORE DETAILS, CLICK FOLLOWING URL http://www.XXXX.XXX.ID1001.html

[ OK ]  [ CANCEL ]

FIG. 41

STATISTIC DB 153

| ABNORMALITY ID | CAUSE OF ABNORMALITY | NUMBER OF EVENTS | PERCENTAGE (%) | REPLACEMENT PART ID | NUMBER OF EVENTS | PERCENTAGE (%) |
|---|---|---|---|---|---|---|
| 1001 | DESIGN FAILURE | ⋮ | ⋮ | A | ⋮ | ⋮ |
| | | | | B | ⋮ | ⋮ |
| | | | | C | ⋮ | ⋮ |
| | | | | ⋮ | ⋮ | ⋮ |
| | MECHANICAL PART FAILURE | ⋮ | ⋮ | P | ⋮ | ⋮ |
| | | | | Q | ⋮ | ⋮ |
| | | | | R | ⋮ | ⋮ |
| | | | | ⋮ | ⋮ | ⋮ |
| | ELECTRICAL PART FAILURE | ⋮ | ⋮ | S | ⋮ | ⋮ |
| | ⋯ | ⋯ | ⋯ | ⋯ | ⋯ | ⋯ |
| 1002 | | | | | | |

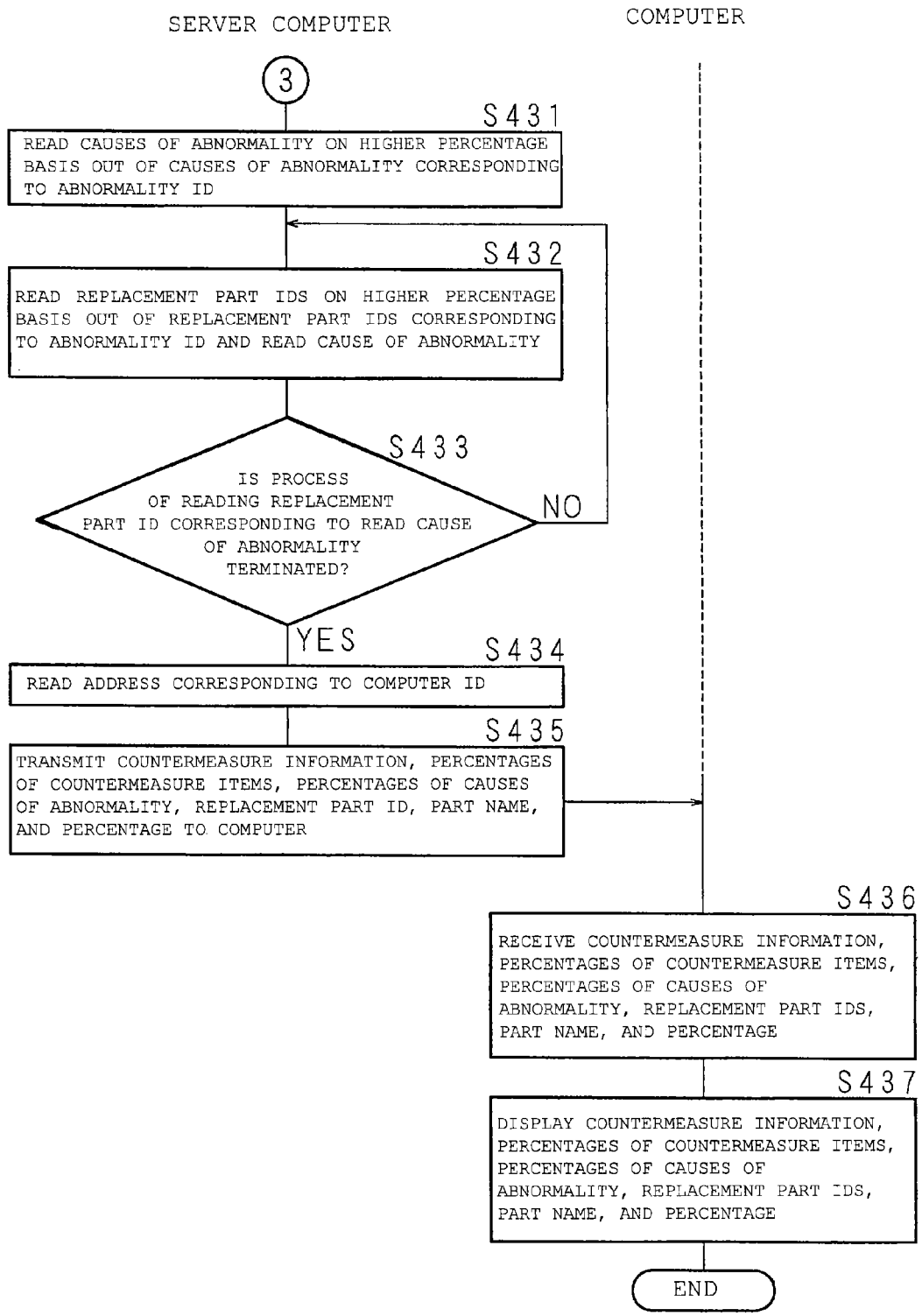

FIG. 44

```
COUNTERMEASURE INFORMATION

OCCURRENCE DATE/TIME: 2010/9/30/15:35:20
ABNORMALITY ID: 1001
ABNORMALITY INFORMATION: FIRST SENSOR OF STAGE DOES NOT
RESPOND
STATISTIC
COUNTERMEASURE ITEM:  ⌈RETRY 60%⌋  ⌈PROCESSING CONTINUED 25%⌋  ⌈RESTART 15%⌋
CAUSE OF ABNORMALITY:

⌈MECHANICAL PART FAILURE: 65%⌋

⌈PART A (REPLACEMENT PART ID A01)  80%⌋
    ⌈PART B (REPLACEMENT PART ID B01)  10%⌋
    ⌈PART C (REPLACEMENT PART ID C01)  5%⌋

⌈ELECTRICAL PART FAILURE  X EVENTS 30%⌋
    ⌈PART D (REPLACEMENT PART ID D01)  75%⌋
    ⌈PART E (REPLACEMENT PART ID E01)  12%⌋
    ⌈PART F (REPLACEMENT PART ID F01)  10%⌋

COUNTERMEASURE INFORMATION: ABNORMALITY OCCURRED
DUE TO DISCONNECTION OF CABLE · · ·

[ O K ]   [ CANCEL ]
```

INFORMATION PROCESSING APPARATUS, PROCESSING SYSTEM, PROCESSING METHOD, AND PROGRAM

CROSS-REFERENCE TO RELATED APPLICATIONS

The present application is a continuation of PCT/JP2012/053603, filed Feb. 16, 2012, which is based upon and claims the benefit of priority to Japanese Application No. 2011-072935, filed Mar. 29, 2011. The entire contents of these applications are incorporated herein by reference.

BACKGROUND

1. Field of the Invention

The present invention relates to an information processing apparatus, a processing system, a processing method, and a program for processing information regarding a semiconductor treatment apparatus.

2. Description of Background Art

In the related art, there are proposed a host computer that monitors industrial machinery inside a factory and a system connected to a vendor-side computer that transmits response information to the host computer from the vendor-side computer when an abnormality occurs in the industrial machinery (for example, refer to Japanese Patent No. 2706793). The entire contents of this publication are incorporated herein by reference.

SUMMARY OF THE INVENTION

According to one aspect of the present invention, an information processing apparatus for processing information on a semiconductor treatment apparatus includes an abnormality information display device which displays information on an abnormality when the abnormality occurs in a semiconductor treatment apparatus, a countermeasure information receiving device which receives countermeasure information on a countermeasure to the abnormality, a countermeasure information storing device which stores the countermeasure information such that the countermeasure information is matched with abnormality identification information for identifying the abnormality, an output device which outputs the countermeasure information and the abnormality identification information stored in the countermeasure information storing device via a communication device to the outside, a countermeasure item display device which displays countermeasure item candidates when the abnormality occurs, a countermeasure item storing device which stores a countermeasure item selected from the countermeasure item candidates displayed on the countermeasure item display device such that the countermeasure item is matched with the abnormality identification information, a countermeasure item transmitting device which transmits the countermeasure item and the abnormality identification information stored in the countermeasure item storing device via the communication device to the outside, a countermeasure item statistic receiving device which receives a statistic regarding the countermeasure item corresponding to the abnormality identification information transmitted from the outside, and a countermeasure item statistic display device which displays the statistic regarding the countermeasure item for the abnormality identification information received by the countermeasure item statistic receiving device when the abnormality occurs.

According to another aspect of the present invention, a semiconductor treatment system includes a semiconductor treatment apparatus, multiple information processing apparatuses for processing information on the semiconductor treatment apparatus, and a server computer connected to the information processing apparatuses via a communication network. The information processing apparatuses includes a first information processing apparatus and a second information processing apparatus, the first information processing apparatus has an abnormality information display device which displays information on an abnormality when the abnormality occurs in the semiconductor treatment apparatus, a countermeasure information receiving device which receives countermeasure information regarding a countermeasure for the abnormality, a countermeasure information storing device which stores the countermeasure information such that the countermeasure information is matched with abnormality identification information for identifying the abnormality, an output device which outputs the countermeasure information and the abnormality identification information stored in the countermeasure information storing device to the server computer via the communication network, a countermeasure item display device which displays countermeasure item candidates when the abnormality occurs, a countermeasure item storing device which stores a countermeasure item selected from the countermeasure item candidates displayed on the countermeasure item display device such that the countermeasure item is matched with the abnormality identification information, and a countermeasure item transmitting device which transmits the countermeasure item and the abnormality identification information stored in the countermeasure item storing device to the server computer via the communication network, the server computer has a server computer countermeasure information storing device which stores the abnormality identification information and the countermeasure information transmitted from the first information processing apparatus, a countermeasure information reading device which reads the countermeasure information corresponding to the abnormality identification information stored in the information storing device, a countermeasure information transmitting device which transmits the countermeasure information corresponding to the abnormality identification information read by the countermeasure information reading device to the second information processing apparatus, a countermeasure item storing device which stores the countermeasure item and the abnormality identification information transmitted from the first information processing apparatus, a statistic generating device which generates a statistic regarding the countermeasure item corresponding to the abnormality identification information based on countermeasure items corresponding to abnormality identification information data stored in the countermeasure item storing device, and a statistic transmitting device which transmits the statistic regarding the countermeasure item corresponding to the abnormality identification information generated by the statistic generating device to the second information processing apparatus, and the second information processing apparatus has a countermeasure information receiving device which receives the countermeasure information corresponding to the abnormality identification information transmitted from the server computer, a countermeasure information display device which displays the countermeasure information received by the receiving device, a countermeasure item statistic receiving device which receives the statistic regarding the countermeasure item corresponding to the abnormality identification information transmitted from the server computer, and a countermeasure item statistic display device which displays the statistic regarding the countermeasure item for the abnormality identification information received by the countermeasure item statistic receiving device when the abnormality occurs.

According to yet another aspect of the present invention, a method of processing information on a semiconductor treatment apparatus using an information processing apparatus includes displaying information on an abnormality when the abnormality occurs in a semiconductor treatment apparatus, receiving countermeasure information regarding a countermeasure for the abnormality by a control device of the information processing apparatus, storing the countermeasure information received by the control device in the control device such that the countermeasure information is matched with abnormality identification information for identifying the abnormality, outputting the abnormality identification information and the countermeasure information stored in the control device to the outside via a communication device, displaying countermeasure item candidates according to the control device when the abnormality occurs, storing a countermeasure item selected from the countermeasure item candidates such that the countermeasure item is matched with the abnormality identification information, transmitting the abnormality identification information and countermeasure item stored to the outside via the communication device, receiving the statistic regarding the countermeasure item corresponding to the abnormality identification information transmitted from the outside, and displaying the statistic regarding the countermeasure item for the abnormality identification information on the abnormality according to the control device when the abnormality occurs.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is an explanatory diagram illustrating an image on a selection screen;

FIG. 7 is an explanatory diagram illustrating an image on a countermeasure information input screen;

FIG. 11 is an explanatory diagram illustrating a record layout of a countermeasure information DB;

FIG. 12 is an explanatory diagram illustrating a display image of countermeasure information;

FIG. 17 is an explanatory diagram illustrating a record layout of an abnormality file according to Embodiment 3;

FIG. 18 is an explanatory diagram illustrating an image of an abnormality information display screen;

FIG. 19 is an explanatory diagram illustrating a record layout of a countermeasure information file;

FIG. 20 is an explanatory diagram illustrating an image of a countermeasure information input screen;

FIG. 21 is an explanatory diagram illustrating a record layout of a countermeasure information DB according to Embodiment 2;

FIG. 25 is an explanatory diagram illustrating a record layout of a statistic DB;

FIG. 26 is an explanatory diagram illustrating a display image of countermeasure information;

FIG. 29 is an explanatory diagram illustrating a countermeasure information input screen;

FIG. 30 is an explanatory diagram illustrating a record layout of a countermeasure information file according to Embodiment 5;

FIG. 31 is an explanatory diagram illustrating a record layout of a countermeasure information DB;

FIG. 33 is an explanatory diagram illustrating a record layout of an abnormality file according to Embodiment 6;

FIG. 35 is an explanatory diagram illustrating a record layout of an apparatus DB according to Embodiment 7;

FIG. 36 is an explanatory diagram illustrating an image of a warning screen;

FIG. 41 is an explanatory diagram illustrating a record layout of a statistic DB according to Embodiment 10;

FIG. 43 is a flowchart illustrating a sequence of statistic display processing; and FIG. 44 is an explanatory diagram illustrating a display image of countermeasure information.

DETAILED DESCRIPTION OF THE EMBODIMENTS

Figure 1:
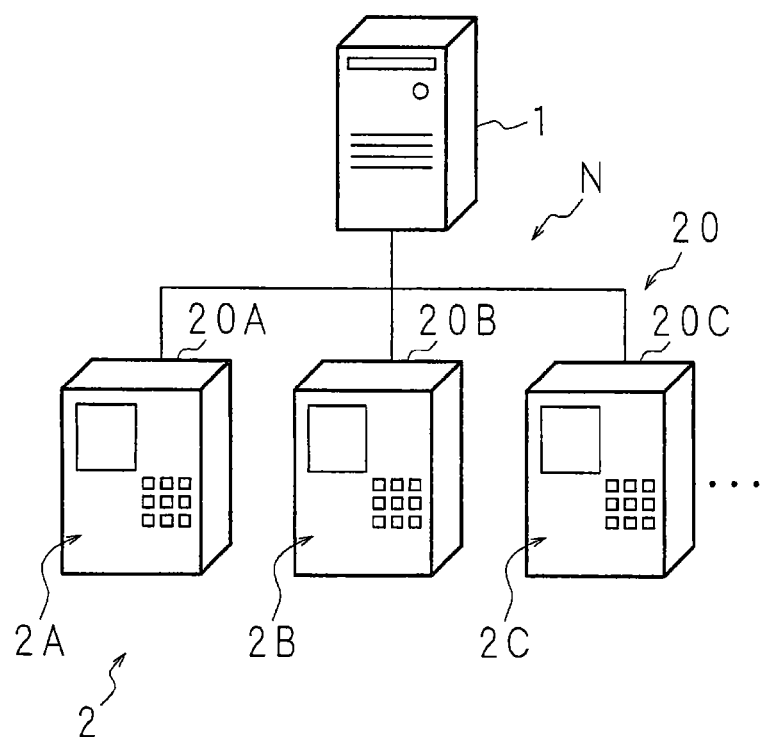
FIG. 1 is a schematic diagram illustrating a processing system.

The embodiments will now be described with reference to the accompanying drawings, wherein like reference numerals designate corresponding or identical elements throughout the various drawings.

Embodiment 1

Hereinafter, embodiments will be described with reference to the accompanying drawings. FIG. 1 is a schematic diagram illustrating a processing system. The processing system includes a computer 1, a semiconductor treatment apparatus 20, an information processing apparatus 2, and the like. The semiconductor treatment apparatus 20 is an apparatus for performing a treatment for a semiconductor under control of the information processing apparatus 2. The semiconductor treatment apparatus 20 is, for example, a film forming apparatus, a cleaning apparatus, an etching apparatus, or an exposure apparatus for forming an oxide film on a wafer. In Embodiment 1, it is assumed that the semiconductor treatment apparatus 20 is a film-forming apparatus 20, but is not limited to that.

The information processing apparatus 2 includes, for example, a computer embedded in the film-forming apparatus 20, a personal computer (PC) or a personal digital assistant (PDA) mounted in the external side of the film-forming apparatus 20, or the like. In Embodiment 1, it is assumed that the information processing apparatus 2 is, for example, a computer 2 embedded in the film-forming apparatus 20. The computer 1 connected to multiple computers 2 via a communication network N such as a local area network (LAN) or the Internet is, for example, a server computer or a personal computer. In the following description, it is assumed that the computer 1 is a server computer 1. The server computer 1 transmits and receives information between computers 2A, 2B, 2C, ..., and so on (hereinafter, representatively referred to as a computer 2) connected via a communication network N based on a protocol such as a hypertext transfer protocol (HTTP).

The computers 2A, 2B, and 2C are embedded in the film-forming apparatuses 20A, 20B, and 20C, respectively (hereinafter representatively referred to as 20). For example, when an abnormality is generated in the film-forming apparatus 20A, the computer 2A displays abnormality information regarding the generated abnormality. A user inputs countermeasure information for addressing the abnormality to the computer 2A. The computer 2A transmits to the server computer 1 the input countermeasure information together with abnormality identification information (hereinafter referred to as abnormality ID) for identifying the abnormality.

Then, when the same abnormality is generated in another film-forming apparatus 20B, the computer 2B transmits the abnormality ID to the server computer 1. The server computer 1 transmits the countermeasure information corresponding to the abnormality ID to the computer 2B. The transmitted countermeasure information is displayed on the computer 2B together with the abnormality information, so that a user can respond to the abnormality based on the countermeasure information as know-how. Hereinafter, details of such processing will be described. Each semiconductor treatment apparatus 20 may be another type of apparatus. For example, the semiconductor treatment apparatus 20 may be obtained by integrating the film-forming apparatus 20A, the etching apparatus 20B, and the exposure apparatus 20C. Although it is assumed that each semiconductor treatment apparatus 20 is installed in a single facility such as a factory or a laboratory in Embodiment 1, the invention is not limited to that. For example, the film-forming apparatuses 20A and 20B may be installed in a single factory, and the film-forming apparatus 20C may be installed in another factory, so that they may be connected to each other via a communication network N.

Figures 2, 3:
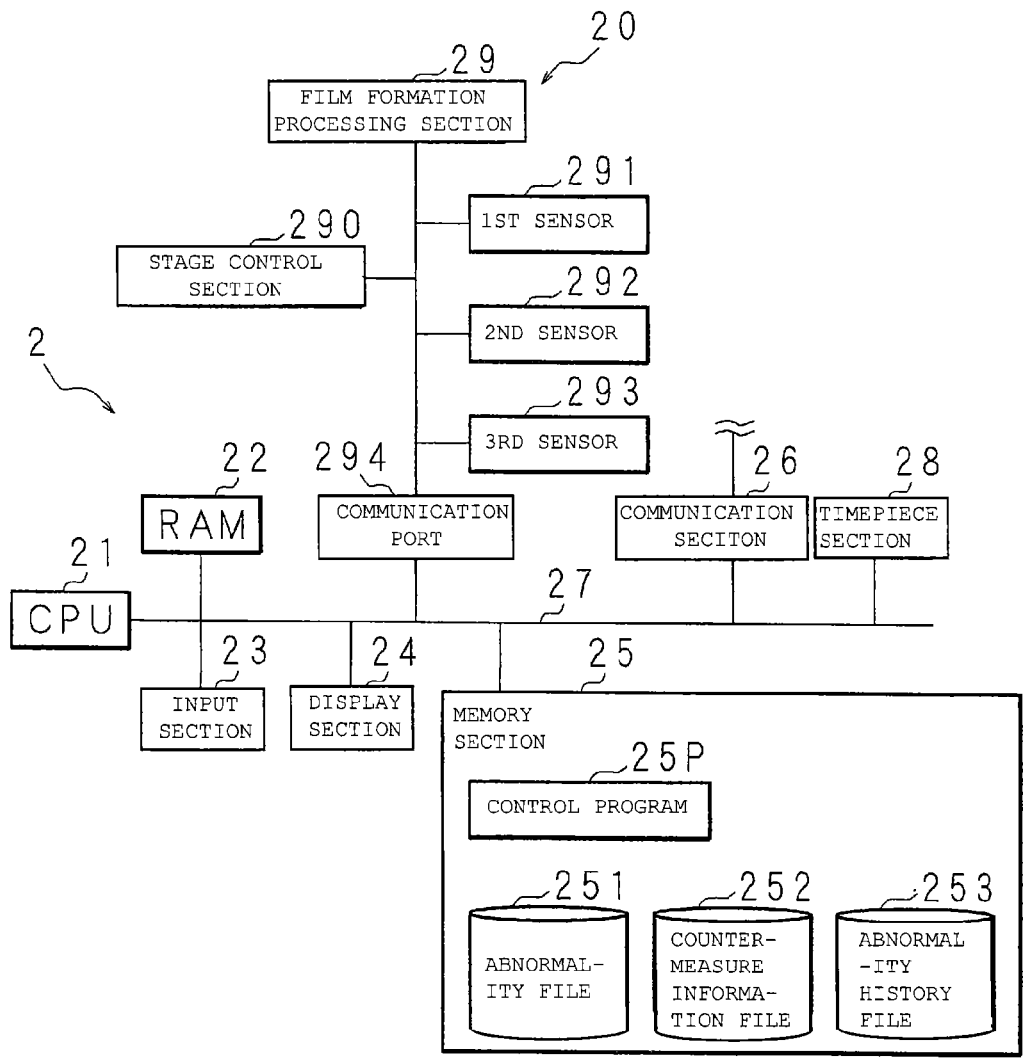
FIG. 2 is a block diagram illustrating a hardware group of a computer.
FIG. 3 is an explanatory diagram illustrating a record layout of an abnormality file.

FIG. 2 is a block diagram illustrating a hardware group of the computer 2. The computer 2 includes a central processing unit (CPU) 21 as a controller, a random access memory (RAM) 22, an input section 23, a display section 24, a memory section 25, a communication section 26, a communication port 294, a timepiece section 28 and the like. The film-forming apparatus 20 is connected to the computer 2 using the communication port 294.

The CPU 21 is connected to each section of the hardware through a bus 27. The CPU 21 controls each section of the hardware and executes various software functionalities depending on a control program 25P stored in the memory section 25. The input section 23 is an input device such as a mouse, a keyboard, a control button, a switch, and a touch panel for controlling the film-forming apparatus 20. The input section 23 outputs the input manipulation information to the CPU 21. The display section 24 is a liquid crystal display, an organic electroluminescence (EL) display, or the like for displaying various types of information such as abnormality information in response to an instruction from the CPU 21.

The RAM 22 includes, for example, a static RAM (SRAM), a dynamic RAM (DRAM), a flash memory, or the like. The RAM 22 also serves as a memory section to temporarily store various data generated in the course of execution of various programs in the CPU 21. The communication section 26 includes a wireless/wired LAN card and the like. The communication section 26 transmits or receives information to/from the server computer 1 via a communication network N. The timepiece section 28 outputs the date/time information to the CPU 21.

The memory section 25 includes, for example, a hard disk, a large-capacity flash memory, or the like. In addition to the aforementioned control program 25P, the memory section 25 stores an abnormality file 251, a countermeasure information file 252, and an abnormality history file 253. In Embodiment 1, for the sake of simplified description, it is assumed that the abnormality file 251, the countermeasure information file 252, and the abnormality history file 253 are stored in the memory section 25. However, the invention is not limited to that. The abnormality file 251, the countermeasure information file 252, or the abnormality history file 253 may be stored in a server computer 1 or a database (hereinafter referred to as a DB) server (not illustrated), and the CPU 21 may read or store the data as necessary.

The communication port 294 includes, for example, a universal serial bus (USB) port, a communication port based on a standard RS232C, or the like. The communication port 294 is used to transmit or receive information between the computer 2 and the film-forming apparatus 20. The film-forming apparatus 20 includes a film formation processing section 29, a stage control section 290, a first sensor 291, a second sensor 292, a third sensor 293, and the like. The film formation processing section 29 forms, for example, an oxide film or the like on a wafer. The stage control section 290 controls movement of a stage where the wafer is placed. The first to third sensors 291 to 293 are sensors for detecting a temperature of the film-forming apparatus 20, a gas flow rate, a position of the stage, and the like. Although only a part of the functionalities of the film-forming apparatus 20 are described in Embodiment 1 for the sake of simplified description, other structures may also be included.

FIG. 3 is an explanatory diagram illustrating a record layout of the abnormality file 251. The abnormality file 251 stores abnormality information regarding abnormalities generated in the film-forming apparatus 20 by matching the abnormality ID. The abnormality file 251 includes an abnormality ID field and an abnormality information field. The abnormality ID field contains a unique ID for identifying abnormalities generated in the film-forming apparatus 20. The abnormality information field contains abnormality information by matching the abnormality ID. For example, an abnormality ID "1001" corresponds to abnormality information indicating a fact that the first sensor 291 that detects movement in the X-axis direction of the stage is not activated. In addition, according to Embodiment 1, an abnormality is identified using the abnormality ID. However, the invention is not limited to that. For example, an abnormality may be identified using a combination of parts or sensors in the film formation processing section 29. For example, the abnormality ID "1001" may correspond to an abnormality in the "stage" and the "first sensor." In addition, the abnormality ID "1002" may correspond to an abnormality in the "stage" and the "second sensor." Furthermore, the abnormality ID "2003" may correspond to an abnormality in the "gas supply section" and the "third sensor."

Figures 4, 5:
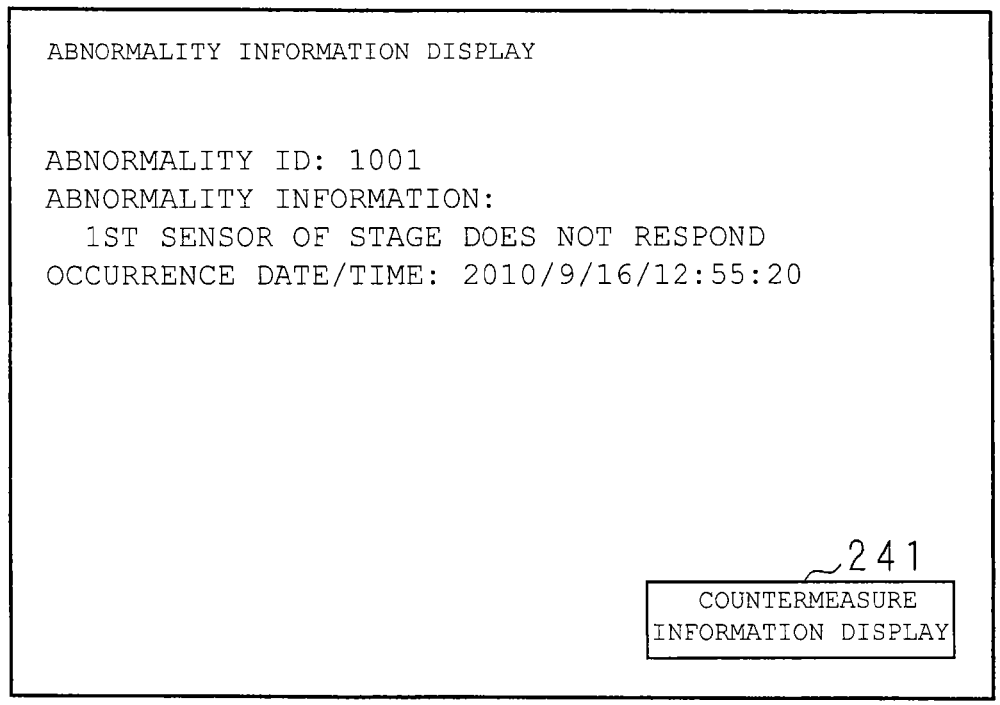
FIG. 4 is an explanatory diagram illustrating a display image of abnormality information.
FIG. 5 is an explanatory diagram illustrating a record layout of an abnormality history file.

FIG. 4 is an explanatory diagram illustrating a display image of the abnormality information. When an abnormality occurs, the film-forming apparatus 20 outputs the abnormality ID to the CPU 21 via the communication port 294. The CPU 21 reads the abnormality information corresponding to the abnormality ID from the abnormality file 251 and displays the abnormality information on the display section 24. In addition, the CPU 21 obtains date/time information output from the timepiece section 28 when the abnormality ID is output. The CPU 21 displays the obtained date/time information on the display section 24 as occurrence date/time. As illustrated in FIG. 4, the abnormality ID, the abnormality information and the occurrence date/time are displayed. As the abnormality information of the abnormality ID "1001," a notification "first sensor of stage is in response" is displayed. In addition, the image data and the template data for screen display are stored in the memory section 25. In addition, the CPU 21 displays the countermeasure information display button 241 for displaying the countermeasure information on the display section 24. The processing performed when the countermeasure information display button 241 is pressed will be described below.

FIG. 5 is an explanatory diagram illustrating a record layout of the abnormality history file 253. The abnormality history file 253 stores a history of the generated abnormality. The abnormality history file 253 includes an occurrence date/time field and an abnormality ID field. The occurrence date/time field contains the occurrence date/time at the time of occurrence of the abnormality. The abnormality ID field contains the abnormality ID by matching the occurrence date/time. The CPU 21 stores the abnormality ID and the occurrence date/time in the abnormality history file 253 when the abnormality ID is output from the film-forming apparatus 20.

FIG. 6 is an explanatory diagram illustrating an image of the selection screen. When a user inputs the countermeasure information as know-how to cope with an abnormality, a command to display a selection screen for selecting a history of the abnormality generated in the past is input from the input section 23. When the CPU 21 receives a command to display the selection screen from the input section 23, the CPU 21 reads the occurrence date/time and the abnormality ID from the abnormality history file 253 and displays them on the display section 24. The CPU 21 displays occurrence date/time, the abnormality ID, and check boxes for selection on the selection screen. A user inputs the countermeasure information from the input section 23 and selects one of the occurrence date/times and one of the abnormality IDs and presses the OK-button.

FIG. 7 is an explanatory diagram illustrating an image of the countermeasure information input screen. The CPU 21 receives the occurrence date/time and the abnormality ID selected on the selection screen and reads the abnormality information corresponding to the abnormality ID from the abnormality file 251. As illustrated in FIG. 7, the CPU 21 displays the occurrence date/time, the abnormality ID, and the abnormality information on the countermeasure information input screen. In addition, the CPU 21 displays a screen for prompting input of the user ID. Furthermore, the CPU 21 displays the countermeasure information input box 242 for inputting the countermeasure information. The user ID is identification information for identifying a user who inputs the countermeasure information. The CPU 21 receives the user ID input from the input section 23. Instead of the user ID, information, such as a name, that can be used to identify a user may be input.

A user inputs the countermeasure information to the countermeasure information input box 242 from the input section 23. The countermeasure information is input by a text sentence when a user confronts an abnormality. In addition, the input of the countermeasure information is not limited to the text sentence. For example, an application file such as an image file, a voice file, or a portable document format (PDF, registered trademark) file may also be input. When the OK button is input from the input section 23, the CPU 21 receives the input user ID and the input countermeasure information. The CPU 21 stores the input countermeasure information and the input user ID in the countermeasure information file 252 by matching the occurrence date/time and the abnormality ID.

Figures 8, 9, 10:
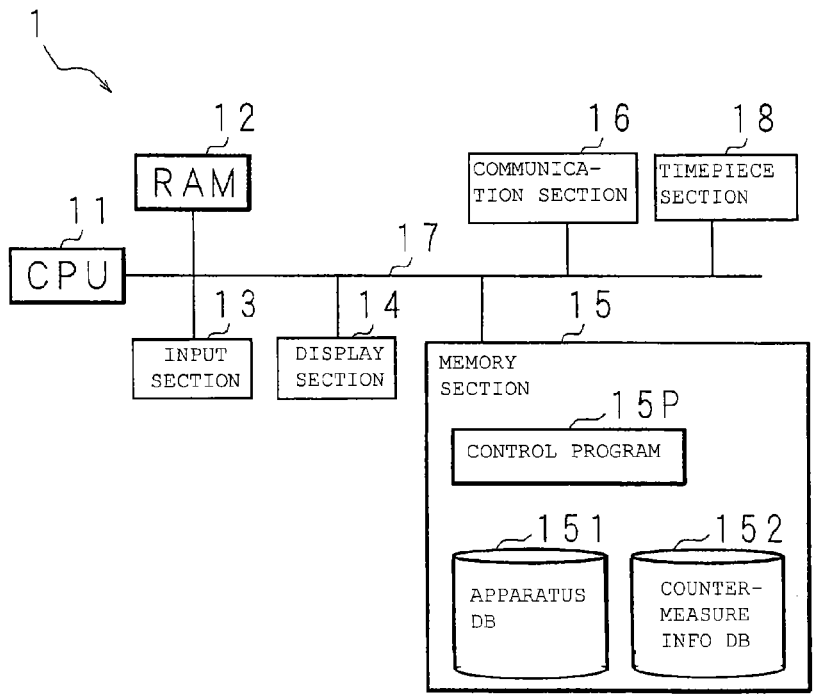
FIG. 8 is an explanatory diagram illustrating a record layout of a countermeasure information file.
FIG. 9 is an explanatory diagram illustrating a hardware group of a server computer.
FIG. 10 is an explanatory diagram illustrating a record layout of an apparatus DB.

FIG. 8 is an explanatory diagram illustrating a record layout of the countermeasure information file 252. The countermeasure information file 252 includes an occurrence date/time field, an abnormality ID field, a countermeasure ID field, a countermeasure information field, a user ID field, and the like. The countermeasure information field contains the countermeasure information input to the countermeasure information input box 242 by matching the occurrence date/time and the abnormality ID. The countermeasure ID field contains unique identification information for identifying the countermeasure information. The user ID field contains the user ID of a user who inputs the countermeasure information on the countermeasure information input screen by matching the countermeasure information. The CPU 21 transmits information containing the abnormality ID and the countermeasure information stored in the countermeasure information file 252 to the server computer 1 via the communication section 26 at an appropriate timing. Although it is assumed that the countermeasure information file 252 is prepared in the memory section 25 in Embodiment 1, the invention is not limited to that. The countermeasure information and the abnormality ID may be temporarily stored in the RAM 22 without using the memory section 25 and may be transmitted to the server computer 1. A data layout of the file and the DB referred to in Embodiment 1 is just for illustrative purposes, and any other type may be employed if a relationship between the data is maintained.

FIG. 9 is an explanatory diagram illustrating a hardware group of the server computer 1. The server computer 1 includes a CPU 11 as a controller, a RAM 12, an input section 13, a display section 14, a communication section 16, a timepiece section 18, a memory section 15, and the like. The CPU 11 is connected to each section of the hardware via a bus 17. The CPU 11 controls each section of the hardware and executes a software functionality based on a control program 15P stored in the memory section 15. The timepiece section 18 outputs date/time to the CPU 11. The communication section 16 is a gateway that performs a functionality of the firewall or the like and is used to transmit or receive information between a computer 2 and other server computers (not illustrated) via a protocol such as HTTP.

The input section 13 is an input device such as a mouse, a keyboard, and a touch panel. The input section 13 outputs the input manipulation information to the CPU 11. The display section 14 includes a liquid crystal, an organic EL display, or the like and displays various types of information such as abnormality information in response to an instruction from the CPU 11. The RAM 12 includes, for example, an SRAM, a DRAM, a flash memory, or the like. The RAM 12 also serves as a memory section and temporarily stores various data generated when the CPU 11 executes various programs. The memory section 15 includes, for example, a hard disk, a large-capacity memory, or the like. The memory section 15 stores an apparatus DB 151, a countermeasure information DB 152, and the like, in addition to the control program 15P described above. In Embodiment 1, for the sake of simplified description, it is assumed that the apparatus DB 151 and the countermeasure information DB 152 are stored in the memory section 15. However, the invention is not limited to that. The apparatus DB 151 or the countermeasure information DB 152 may be stored in a DB server (not illustrated), and the CPU 11 may read or store data using a structured query language (SQL).

FIG. 10 is an explanatory diagram illustrating a record layout of the apparatus DB 151. The apparatus DB 151 contains a computer ID field, a film-forming apparatus ID field and an address field. The computer ID field contains unique identification information for identifying the computer 2. The film-forming apparatus ID field contains unique identification information for identifying the film-forming apparatus 20 by matching the computer ID. The address field contains an address of the computer 2, such as an Internet protocol (IP) address or a media access control (MAC) address, by matching the computer ID.

FIG. 11 is an explanatory diagram illustrating a record layout of the countermeasure information DB 152. The countermeasure information DB 152 stores an occurrence date/time field, an abnormality ID field, a countermeasure ID field, a countermeasure information field, a user ID field, a computer ID field, and the like. The CPU 11 stores the occurrence date/time, the abnormality ID, the countermeasure ID, the countermeasure information, the user ID, and the computer ID in the countermeasure information DB 152 when they are transmitted from the computer 2 via the communication section 16. For example, the countermeasure information regarding the abnormality ID "1001" is transmitted from the computer 2A having the computer ID "P001" and the computer 2B having the computer ID "P002." As a result, the countermeasure information for each abnormality ID is collected from the computers 2 of each film-forming apparatus 20.

FIG. 12 is an explanatory diagram illustrating a display image of the countermeasure information. A user inputs the countermeasure information display button 241 illustrated in FIG. 4 using the input section 23 when a user desires to obtain the countermeasure information that has been already collected at the time of occurrence of an abnormality. When a manipulation on the countermeasure information display button 241 is received from the input section 23, the CPU 21 transmits a request for acquiring the computer ID, the abnormality ID, and the countermeasure information to the server computer 1 via the communication section 26. The CPU 11 of the server computer 1 receives the request for acquiring the computer ID, the abnormality ID, and the countermeasure information via the communication section 16. The CPU 11 selects the countermeasure information and the countermeasure ID corresponding to the abnormality ID from the countermeasure information DB 152. The CPU 11 reads the address corresponding to the computer ID from the apparatus DB 151.

The CPU 11 transmits the read countermeasure ID and the read countermeasure information to the computer 2 corresponding to the read address. The CPU 21 of the computer 2 displays the received countermeasure ID and the received countermeasure information on the display section 24. In the example of FIG. 12, as the countermeasure information for the abnormality ID "1001", the countermeasure information of the countermeasure IDs "N1001" and "N1008" is displayed. A software process in the aforementioned hardware structure will be described with reference to the accompanying flowchart.

Figure 13:
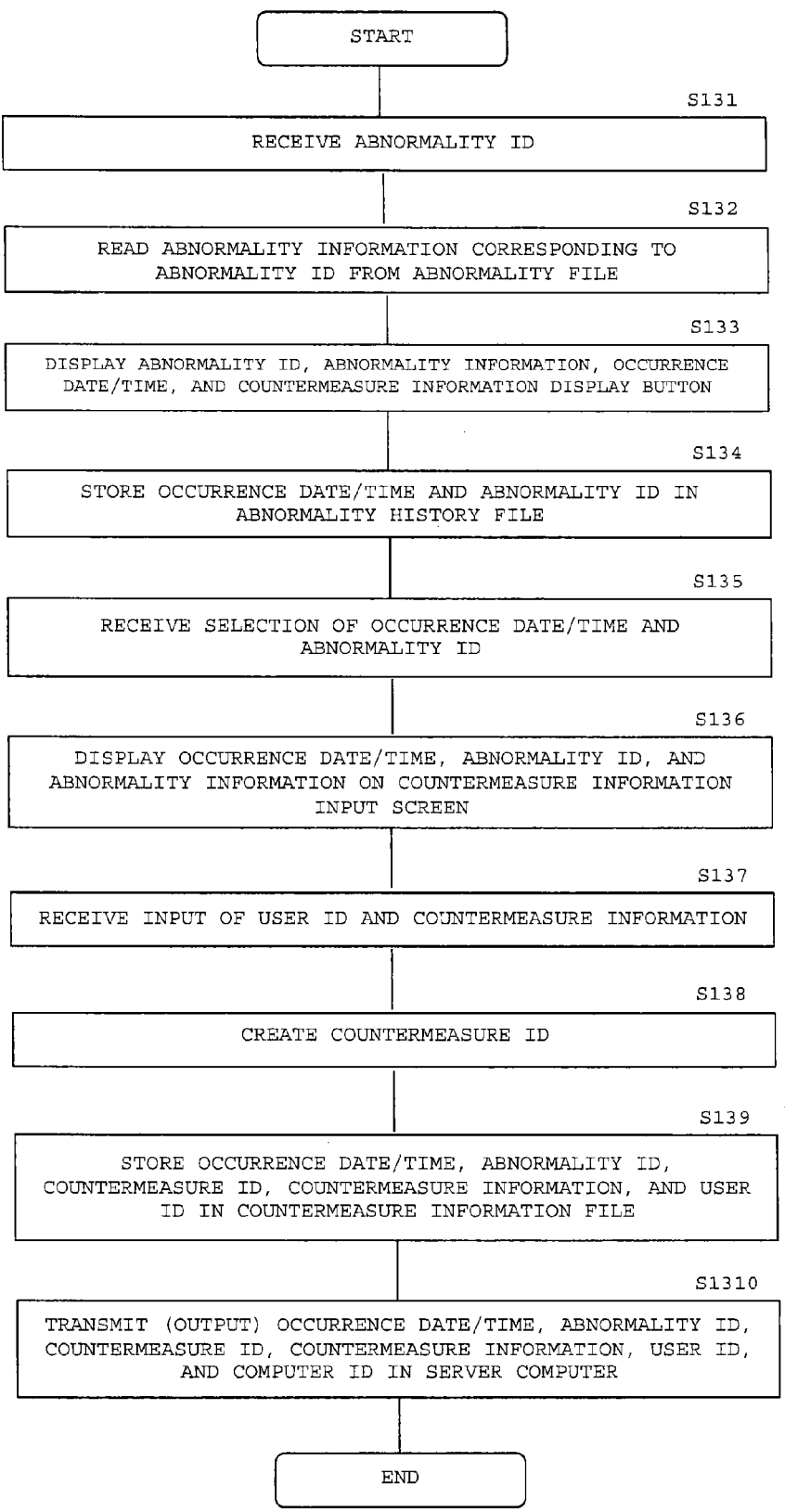
FIG. 13 is a flowchart illustrating a sequence of countermeasure information input processing.

FIG. 13 is a flowchart illustrating a sequence of the countermeasure information input processing. The CPU 21 receives the abnormality ID from the abnormal film-forming apparatus 20 via the communication port 294 (step S131). The CPU 21 reads the abnormality information corresponding to the abnormality ID from the abnormality file 251 (step S132). On the abnormality information display screen of the display section 24, the CPU 21 displays the abnormality ID, the abnormality information, the occurrence date/time of the abnormality based on the date/time information obtained from the timepiece section 28, and the countermeasure information display button 133 (step S133). The CPU 21 stores the occurrence date/time and the abnormality ID in the abnormality history file 253 by matching each other (step S134).

In order to allow a user to input the countermeasure information, the CPU 21 reads the occurrence date/time and the abnormality ID stored in the abnormality history file 253 and displays them on the display section 24. The CPU 21 receives, via the input section 23, the user's selection of the occurrence date/time and the abnormality ID desired to input the countermeasure information (step S135). The CPU 21 reads the abnormality information corresponding to the selected occurrence date/time and the selected abnormality ID from the abnormality file 251. The CPU 21 displays the occurrence date/time, the abnormality ID, and the abnormality information on the countermeasure information input screen (step S136). In addition, the CPU 21 displays the countermeasure information input box 242 on the display section 24. The CPU 21 receives the user ID and the countermeasure information from the input section 23 (step S137).

The CPU 21 generates a countermeasure ID corresponding to the input countermeasure information (step S138). The CPU 21 stores the occurrence date/time, the abnormality ID, the countermeasure ID, the countermeasure information, and the user ID in the countermeasure information file 252 (step S139). Then, the CPU 21 transmits (outputs) the occurrence date/time, the abnormality ID, the countermeasure ID, the countermeasure information, the user ID, and the computer ID to the server computer 1 via the communication section 26 (step S1310).

Figure 14:
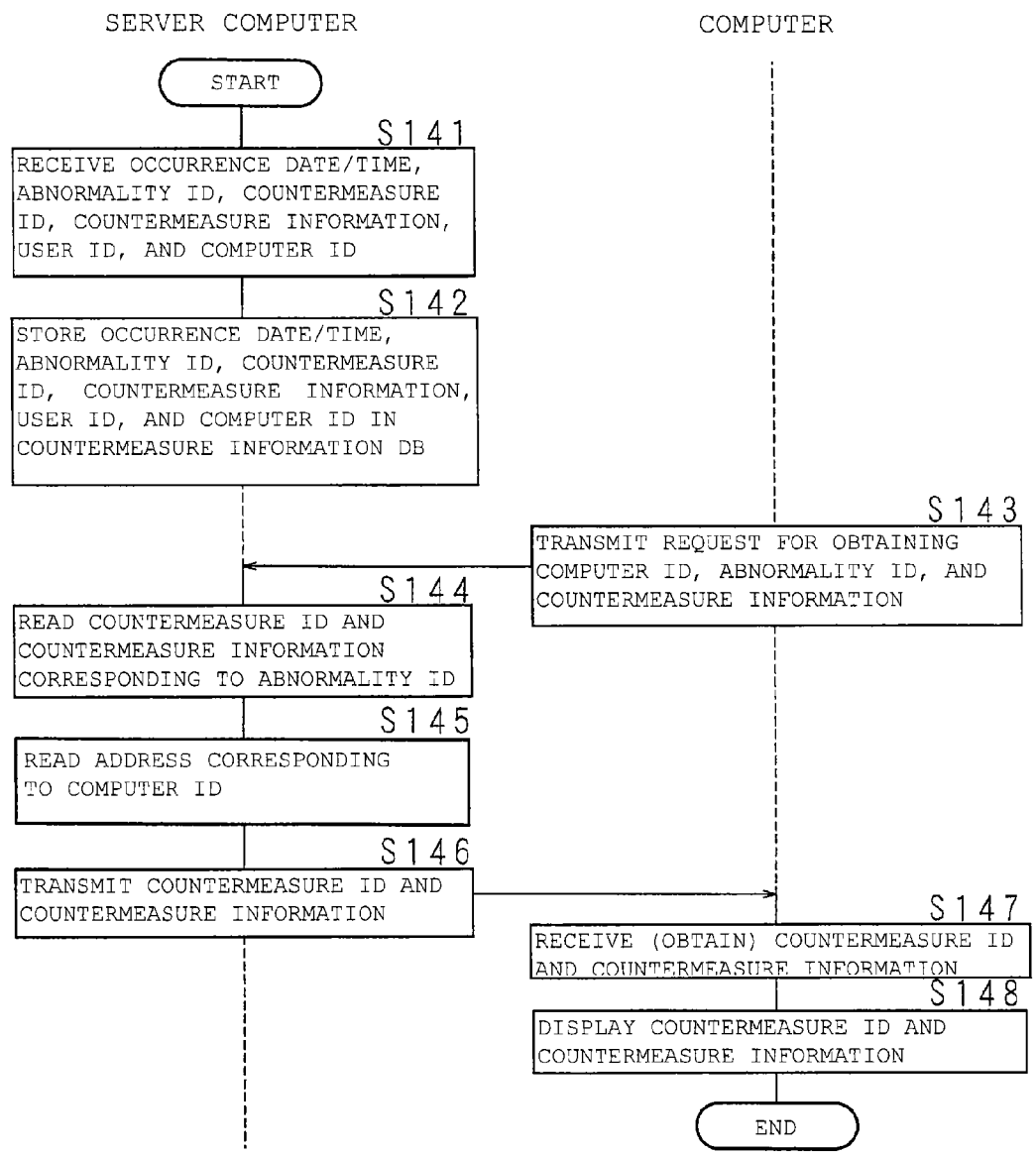
FIG. 14 is a flowchart illustrating a sequence of countermeasure information display processing.

FIG. 14 is a flowchart illustrating a sequence of the countermeasure information display processing. The CPU 11 receives the occurrence date/time, the abnormality ID, the countermeasure ID, the countermeasure information, the user ID, and the computer ID transmitted from the computer 2 (step S141). The CPU 11 stores the received occurrence date/time, the received abnormality ID, the received countermeasure ID, the received countermeasure information, the received user ID, and the received computer ID in the countermeasure information DB 152 (step S142). The CPU 21 of the computer 2 receives an input of the countermeasure information display button 241 from the input section 23. When the input of the countermeasure information display button 241 is received, the CPU 21 transmits a request for acquiring the computer ID, the abnormality ID, and the countermeasure information to the server computer 1 (step S143).

The CPU 11 of the server computer 1 receives the request for acquiring the computer ID, the abnormality ID, and the countermeasure information. The CPU 11 reads the counter-measure ID and the countermeasure information corresponding to the received abnormality ID from the countermeasure information DB 152 (step S144). The CPU 11 reads an address corresponding to the received computer ID from the apparatus DB 151 (step S145). The CPU 11 transmits the read countermeasure ID and the read countermeasure information to a computer 2 corresponding to the read address (step S146). The CPU 21 of the computer 2 receives (acquires) the countermeasure ID and the countermeasure information (step S147).

On the display section 24, the CPU 21 displays the received countermeasure ID and the received countermeasure information together with the abnormality ID, the abnormality information, and the occurrence date/time (step S148). As a result, it is possible to share the countermeasure information input from each computer 2 and effectively cope with the abnormality. In Embodiment 1, a description has been made for an example in which the computer 2 transmits the request for acquiring the countermeasure information to the server computer 1, and the server computer 1 transmits the corresponding countermeasure information. However, that is not the only option. The CPU 11 of the server computer 1 may transmit the countermeasure information corresponding to the abnormality ID to each computer 2 on a regular basis such as every three hours. Each computer 2 may store the countermeasure information corresponding to the received abnormality ID in the memory section 25. When an abnormality occurs, the CPU 21 of the computer 2 may perform a control action such that the countermeasure information corresponding to the abnormality ID is read from the memory section 25 and is displayed.

Embodiment 2

Figure 15:
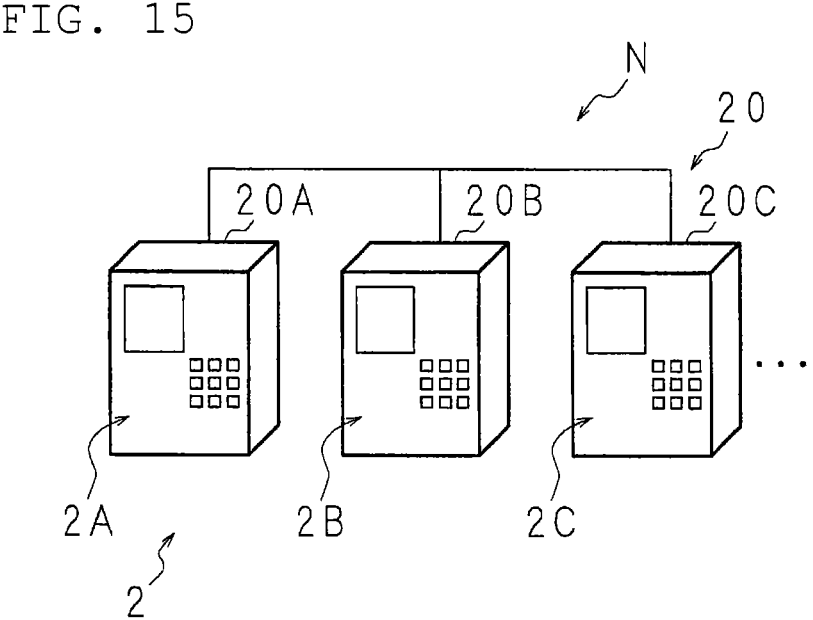
FIG. 15 is a schematic diagram illustrating a processing system according to Embodiment 2.

In Embodiment 2, the countermeasure information is transmitted or received between the computers 2 without using the server computer 1. FIG. 15 is a schematic diagram illustrating a processing system according to Embodiment 2. The computers 2A, 2B, 2C, . . . , and so on are connected to each other via a communication network N in peer-to-peer manner. When the countermeasure information is input to the computer 2A, and the countermeasure information file 252 is updated, the updated countermeasure information is also transmitted to other computers 2B and 2C. When an abnormality occurs, the computer 2A displays the countermeasure information by referencing the countermeasure information file 252 by itself.

Figure 16:
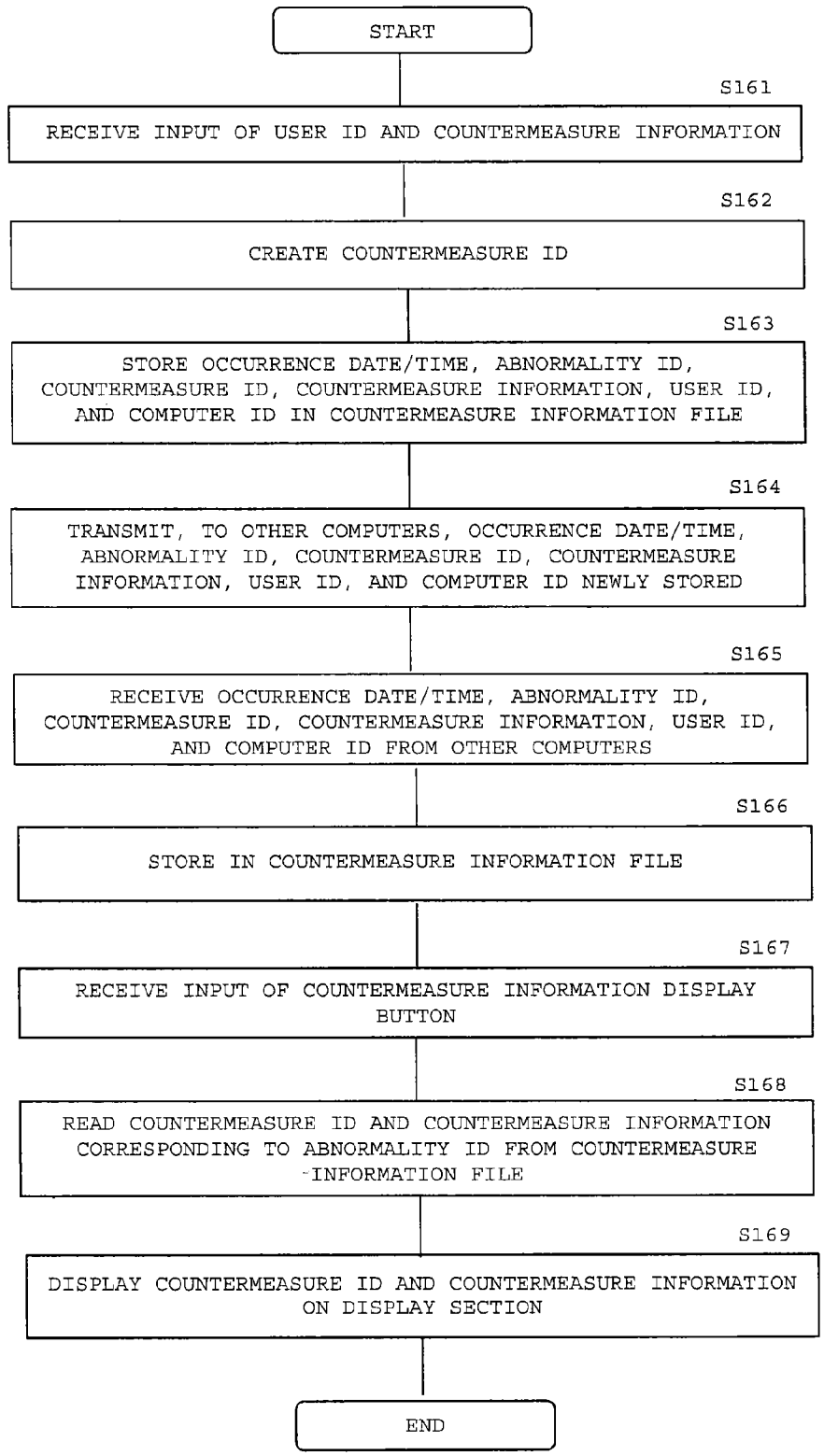
FIG. 16 is a flowchart illustrating a sequence of countermeasure information display processing according to Embodiment 2.

FIG. 16 is a flowchart illustrating a sequence of the countermeasure information display processing according to Embodiment 2. As illustrated in FIG. 7, the CPU 21 receives the user ID and the countermeasure information input from the input section 23 (step S161). The CPU 11 generates the countermeasure ID for identifying the countermeasure information (step S162). The CPU 11 stores the occurrence date/time, the abnormality ID, the countermeasure ID, the countermeasure information, the user ID, and the computer ID in the countermeasure information file 252 (step S163). The CPU 21 transmits, to other computers 2, the occurrence date/time, the abnormality ID, the countermeasure ID, the countermeasure information, the user ID, and the computer ID stored newly (step S164).

In this manner, each computer 2 transmits the updated data to other computers 2 when the countermeasure information file 252 is updated. The CPU 21 of the computer 2 receives the occurrence date/time, the abnormality ID, the countermeasure ID, the countermeasure information, the user ID, and the computer ID transmitted from other computers 2 (step S165). The CPU 21 stores such received information in the countermeasure information file 252 (step S166).

The CPU 21 receives an input of the countermeasure information display button 241 illustrated in FIG. 4 from the input section 23 (step S167). The CPU 21 reads the countermeasure information and the countermeasure ID corresponding to the abnormality ID from the countermeasure information file 252 (step S168). The CPU 21 displays the read countermeasure information and the read countermeasure ID on the display section 24 (step S169). As a result, it is possible to share the countermeasure information between each computer 2 with a simplified structure.

In Embodiment 2, except for those described above, other structures are the same as those in Embodiment 1. Therefore, the same reference numerals apply to corresponding elements, and their descriptions are omitted.

Embodiment 3

In Embodiment 3, a countermeasure item and a cause of abnormality are collected at the time of abnormality. FIG. 17 is an explanatory diagram illustrating a record layout of the abnormality file 251 according to Embodiment 3. The abnormality file 251 contains an abnormality ID field, an abnormality information field, a countermeasure item field, a cause-of-abnormality field, and the like. The countermeasure item field stores multiple candidate countermeasure items at the time of abnormality by matching the abnormality ID. According to Embodiment 3, for example, three countermeasure items are stored. The countermeasure items may include "retry," "processing continued," and "reboot." In each of the candidate countermeasure items, details of the countermeasure item are described by matching the abnormality ID. The cause-of-abnormality field contains multiple causes of abnormality by matching the abnormality ID. For example, the causes of abnormality may include "design failure," "adjustment failure," and the like.

FIG. 18 is an explanatory diagram illustrating an image of the abnormality information display screen. The abnormality ID, the abnormality information, and multiple candidate countermeasure items are displayed. The CPU 21 displays a description of each countermeasure item and the candidate countermeasure item corresponding to the abnormality ID on the display section 24 with reference to the abnormality file 251. For example, as a description of the countermeasure item "retry," a message "stage will be lifted again in case of 'retry'" may be displayed. A user inputs one of the countermeasure items from the input section 23. The CPU 21 receives the countermeasure item input from the input section 23. The CPU 21 outputs a signal corresponding to the countermeasure item to the film-forming apparatus 20.

The film-forming apparatus 20 controls the film formation processing section 29 or the stage control section 290 in response to the signal corresponding to the countermeasure item. The CPU 21 stores the manipulation data input from the input section 23 in the memory section 25 by matching the occurrence date/time and the abnormality ID after an abnormality occurs in the film-forming apparatus 20 until an output of the abnormality ID stops, from occurrence of the abnormality to removal of the abnormality, or from occurrence of the abnormality to a predetermined elapsed time. In addition, other manipulation data input from the film-forming apparatus 20 may also be stored in the memory section 25. According to Embodiment 3, for the sake of simplified description, it is assumed that the manipulation data input from the input section 23 are stored in the memory section 25 from occurrence of the abnormality to a predetermined elapsed time (for example, 5 minutes). In addition, the CPU 21 stores, in the memory section 25, the setup data obtained before occurrence of an abnormality and the data obtained when an abnormality occurs (hereinafter, referred to as sensor data) of the first to third sensors 291, 292, and 293 by matching the occurrence date/time and the abnormality ID.

FIG. 19 is an explanatory diagram illustrating a record layout of the countermeasure information file 252. In addition, there are provided a countermeasure item field, a sensor data field, a manipulation data field, a cause-of-abnormality field, and a replacement part ID field. The countermeasure item field contains the countermeasure item selected by a user on the abnormality information display screen of FIG. 18. As the countermeasure item is input from the input section 23, the CPU 21 stores the countermeasure item in the countermeasure information file 252 by matching the occurrence date/time and the abnormality ID. The sensor data field, the manipulation data field, the cause-of-abnormality field, and the replacement part ID field will be described below.

FIG. 20 is an explanatory diagram illustrating an image of the countermeasure information input screen. In addition to the structure of Embodiment 1, data on the replacement parts and the cause of an abnormality may be input. A user inputs the replacement part ID using the input section 23 when a failed part is to be replaced in the case of an abnormality. The CPU 21 receives the replacement part ID input through the input section 23. Alternatively, without directly inputting the replacement part ID, names of the replacement parts may be listed, and one of them may be selected. As the replacement part ID is input from the input section 23, the CPU 21 stores the replacement part ID in the replacement part ID field of the countermeasure information file 252 by matching the occurrence date/time and the abnormality ID.

The CPU 21 reads multiple causes of abnormality corresponding to the abnormality ID from the abnormality file 251. The CPU 21 displays multiple candidate causes of abnormality on the display section 24. As illustrated in FIG. 20, multiple candidate causes of abnormality are displayed together with a check box as illustrated in FIG. 20. A user selects one of the displayed causes of abnormality. In Embodiment 3, for the sake of simplified description, it is assumed that one of the causes of abnormality is selected. However, multiple causes of abnormality may also be selected.

The CPU 21 receives the selected cause of abnormality from the input section 23. The CPU 21 stores the received cause of abnormality in the cause-of-abnormality field of the countermeasure information file 252 by matching the occurrence date/time and the abnormality ID. On the display section 24, the CPU 21 displays information on whether or not the countermeasure information file 252 stores the manipulation data obtained from the input section 23 and stored in the memory section 25 by matching the occurrence date/time and the abnormality ID at the time of occurrence of abnormality. As illustrated in FIG. 20, when the manipulation data are stored, a check box "attach manipulation data" is selected. As a command for storing the manipulation data is received from the input section 23, the CPU 21 stores the manipulation data of the memory section 25 in the manipulation data field of the countermeasure information file 252 by matching the occurrence date/time and the abnormality ID.

On the display section 24, the CPU 21 displays information on whether or not the countermeasure information file 252 stores the setup data and the abnormality data of the first to third sensors 291, 292, and 293 stored at the time of occurrence of abnormality by matching the occurrence date/time and the abnormality ID. As illustrated in FIG. 20, when the setup data and the abnormality data of the first sensor 291 are stored, a user selects the check box "attach first sensor data." As a command for storing the setup data and the abnormality data of the first to third sensors 291, 292, and 293 is received, the CPU 21 stores such data in the sensor data field of the countermeasure information file 252 by matching the occurrence date/time and the abnormality ID. As the OK button is received from the input section 23, the CPU 21 transmits to the server computer 1 the occurrence date/time, the abnormality ID, the countermeasure ID, the countermeasure information, the user ID, the countermeasure information, the sensor data, the manipulation data, the cause of abnormality, the replacement part ID, and the computer ID.

FIG. 21 is an explanatory diagram illustrating a record layout of the countermeasure information DB 152 according to Embodiment 2. In addition, a countermeasure information field, a sensor data field, a manipulation data field, a cause-of-abnormality field, and a replacement part ID field are provided. The CPU 11 of the server computer 1 stores the occurrence date/time, the abnormality ID, the countermeasure ID, the countermeasure information, the user ID, the countermeasure item, the sensor data, the manipulation data, the cause of abnormality, the replacement part ID, and the computer ID transmitted from the computer 2. As a result, various types of know-how are accumulated in each computer 2.

Figure 22:
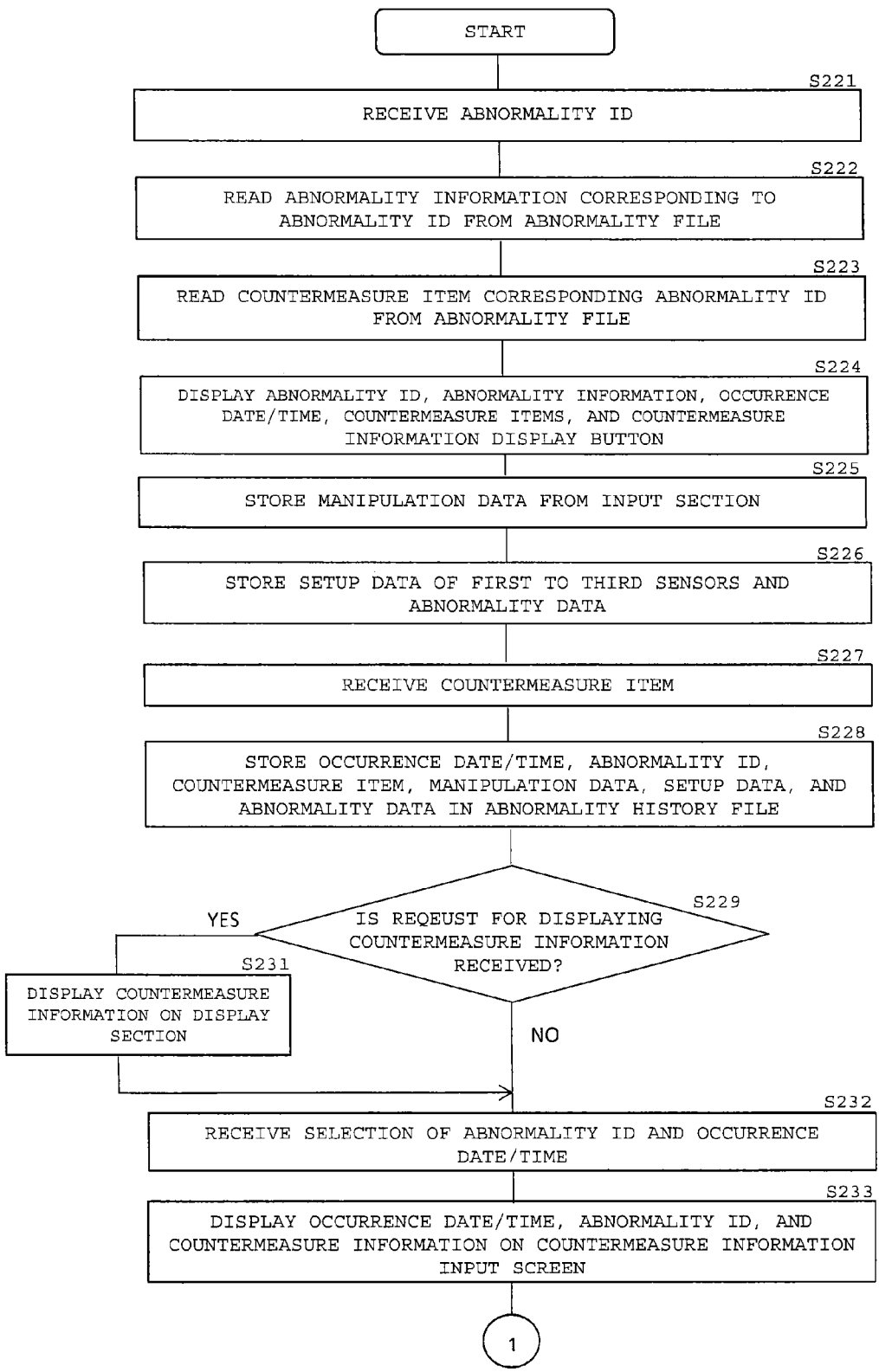
FIG. 22 is a flowchart illustrating a sequence of countermeasure information input processing.
Figure 23:
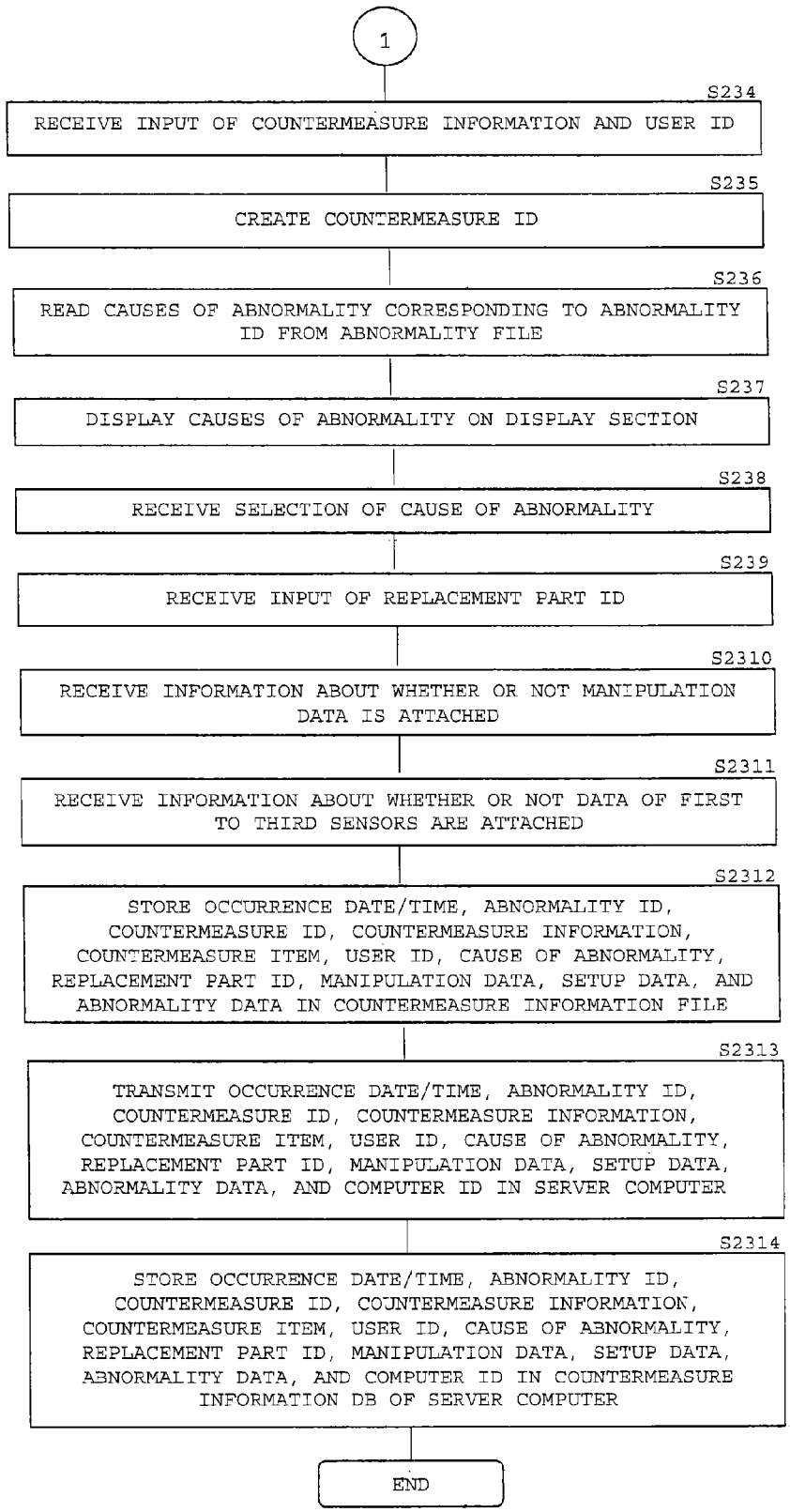
FIG. 23 is a flowchart illustrating a sequence of countermeasure information input processing.

FIGS. 22 and 23 are flowcharts illustrating a sequence of the countermeasure information input processing. The CPU 21 receives the abnormality ID from the abnormal film-forming apparatus 20 via the communication port 294 (step S221). The CPU 21 reads the abnormality information corresponding to the abnormality ID from the abnormality file 251 (step S222). The CPU 21 reads multiple countermeasure items corresponding to the abnormality IDs from the abnormality file 251 (step S223). The CPU 21 displays the abnormality ID, the abnormality information, the abnormality occurrence date/time based on the date/time information obtained from the timepiece section 28, multiple countermeasure items, and the countermeasure information display button 133 on the abnormality information display screen 24 (step S224).

The CPU 21 stores the manipulation data input from a manipulation system or a control system (not illustrated) of the input section 23 or the film-forming apparatus 20 in the memory section 25 by matching the date/time information output from the timepiece section 28 (step S225). The CPU 21 stores, in the memory section 25, the setup data stored in the memory section 25 of the first to third sensors 291, 292, and 293 in advance and the abnormality data output from the first to third sensors 291, 292, and 293 at the time of abnormality by matching each other (step S226). The CPU 21 receives the one selected from multiple countermeasure items via the input section 23 (step S227). The CPU 21 stores in the abnormality history file 253 the occurrence date/time, the abnormality ID, the countermeasure item, the manipulation data, and the setup data and the abnormality data of the first to third sensors 291, 292, and 293 by matching each other (step S228).

The CPU 21 determines whether or not a request for displaying the countermeasure information is received based on the input of the countermeasure information display button 241 (step S229). If it is determined that the request for displaying the countermeasure information is received (YES in step S229), the CPU 21 performs the processing of FIG. 14 to display the countermeasure information on the display section 24 (step S231). If it is determined that the request for displaying the countermeasure information is not received (NO in step S229), the CPU 21 advances the process to step S232.

In order to allow a user to input the countermeasure information, the CPU 21 reads the occurrence date/times and the abnormality IDs stored in the abnormality history file 253 and displays them on the display section 24. The CPU 21 receives a selection of the occurrence date/time and a selection of the abnormality ID desired to input the countermeasure information via the input section 23 (step S232). The CPU 21 reads the abnormality information corresponding to the selected occurrence date/time and the selected abnormality ID from the abnormality file 251. The CPU 21 displays the occurrence date/time, the abnormality ID, and the abnormality information on the countermeasure information input screen (step S233). In addition, the CPU 21 displays the countermeasure information input box 242 on the display section 24. The CPU 21 receives the user ID and the countermeasure information from the input section 23 (step S234).

The CPU 21 generates a countermeasure ID corresponding to the input countermeasure information (step S235). The CPU 21 reads multiple causes of abnormality corresponding to the abnormality ID from the abnormality file 251 (step S236). The CPU 21 displays multiple causes of abnormality on the display section 24 (step S237). The CPU 21 receives a selection of the cause of abnormality via the input section 23 (step S238). The CPU 21 receives an input of the replacement part ID (step S239). If there is no replacement part, it is not necessary to input the replacement part ID.

The CPU 21 receives, via the input section 23, information on whether or not the manipulation data is attached (step S2310). The CPU 21 receives, via the input section 23, information on whether or not the data of the first to third sensors 291, 292, and 293 are attached (step S2311). The CPU 21 stores the occurrence date/time, the abnormality ID, the countermeasure ID, the countermeasure information, the countermeasure item, the user ID, the cause of abnormality, the replacement part ID, the manipulation data, the setup data, and the abnormality data in the countermeasure information file 252 (step S2312). If the information for attaching the manipulation data is not input in step S2310, the manipulation data may not be stored in the countermeasure information file 252. If the information on whether or not the data of the first to third sensors 291, 292, and 293 is not received in step S2311, the setup data and the abnormality data may not be stored in the countermeasure information file 252.

Then, the CPU 21 transmits the occurrence date/time, the abnormality ID, the countermeasure ID, the countermeasure information, the countermeasure item, the user ID, the cause of abnormality, the replacement part ID, the manipulation data, the setup data, the abnormality data, and the computer ID to the server computer 1 via the communication section 26 (step S2313). The CPU 11 of the server computer 1 receives the occurrence date/time, the abnormality ID, the countermeasure ID, the countermeasure information, the user ID, the cause of abnormality, the replacement part ID, the manipulation data, the setup data, the abnormality data, and the computer ID via the communication section 16. The CPU 11 stores the received occurrence date/time, the received abnormality ID, the received countermeasure ID, the received countermeasure information, the received user ID, the received cause of abnormality, the received replacement part ID, the received manipulation data, the received setup data, the received abnormality data, and the received computer ID in the countermeasure information DB 152 (step S2314). As a result, in addition to the countermeasure information input via the input section 23, various types of information can be accumulated as know-how.

In Embodiment 3, except for those described above, other structures are the same as those of Embodiments 1 and 2. Therefore, the same reference numerals apply to corresponding elements, and their descriptions are omitted.

Embodiment 4

Figure 24:
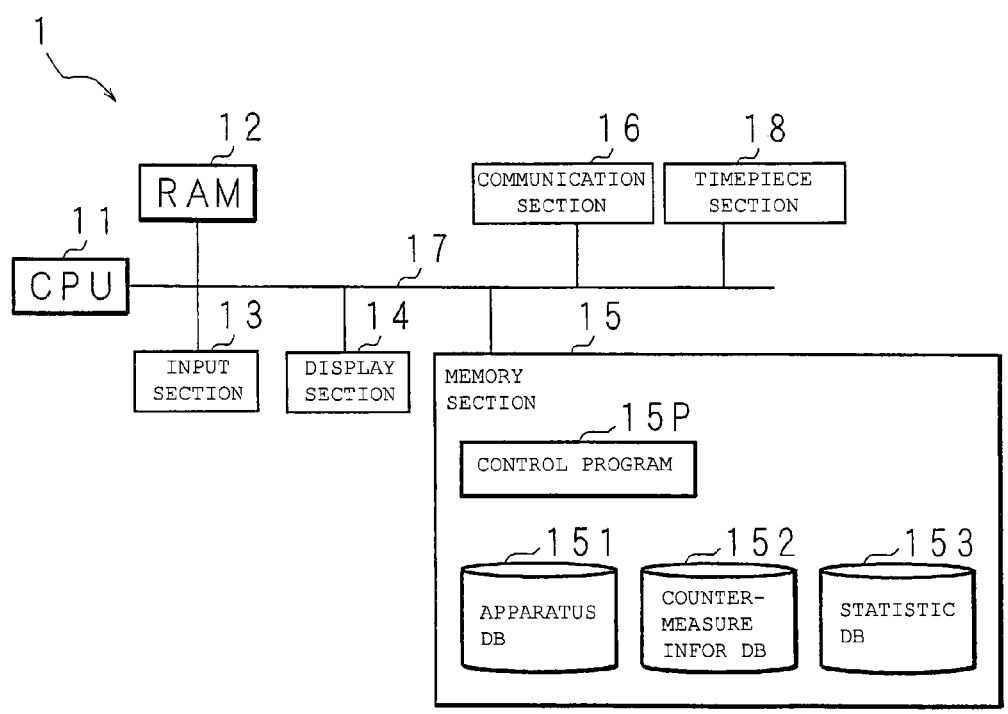
FIG. 24 is a block diagram illustrating a hardware group of a server computer according to Embodiment 4.

In Embodiment 4, statistics of the countermeasure item and the cause of abnormality are displayed along with the countermeasure information. FIG. 24 is a block diagram illustrating a hardware group of the server computer 1 according to Embodiment 4. In the memory section 15, a statistic DB 153 is newly provided. FIG. 25 is an explanatory diagram illustrating a record layout of the statistic DB 153. The statistic DB 153 contains an abnormality ID field, a countermeasure item field, a cause-of-abnormality field, a number-of-events field and a percentage field.

The countermeasure item field contains multiple countermeasure items by matching the abnormality ID. The number-of-events field corresponding to the countermeasure item contains the number of events of the selected countermeasure item by matching the countermeasure item. The CPU 11 of the server computer 1 counts the number of countermeasure items corresponding to the abnormality ID with reference to the countermeasure information file 252. The CPU 11 stores, in the statistic DB 153, the count value for each countermeasure item as the number of events. The CPU 11 computes a percentage of each countermeasure item by subtracting the number of events of each countermeasure item from a total number of the countermeasure items and multiplying the result by 100. The CPU 11 stores the computed percentage in the statistic DB 153 by matching the abnormality ID and the countermeasure item.

The cause-of-abnormality field contains multiple causes of abnormality by matching the abnormality ID. The number-of-events field corresponding to the cause of abnormality contains a count of the selected cause of abnormality by matching the cause of abnormality. The CPU 11 of the server computer 1 counts the number of causes of abnormality corresponding to the abnormality ID with reference to the countermeasure information file 252. The CPU 11 stores in the statistic DB 153 the count result for each cause of abnormality as the number of events. The CPU 11 computes a percentage of each cause of abnormality by subtracting the number of events of each countermeasure item from a total number of the countermeasure items and multiplying the result by 100. The CPU 11 stores the computed percentage in the statistic DB 153 by matching the abnormality ID and the countermeasure item.

FIG. 26 is an explanatory diagram illustrating a display image of the countermeasure information. In addition to the countermeasure information corresponding to the abnormality ID, a statistic of the countermeasure item and a statistic of the cause of abnormality are displayed. As a request for acquiring the abnormality ID and the countermeasure information is received, the CPU 11 of the server computer 1 reads the countermeasure item corresponding to the abnormality ID, the number of events and the percentage of the countermeasure item, the cause of abnormality, and the number of events and the percentage of the cause of abnormality with reference to the statistic DB 153. The CPU 11 transmits the countermeasure item, the number of events and the percentage of the countermeasure item, the cause of abnormality, and the number of events and the percentage of the cause of abnormality to the computer 2. On the display section 24, the CPU 21 of the computer 2 displays the number of events and the percentage of each countermeasure item and the number of events and the percentage of the cause of abnormality as illustrated in FIG. 26.

Here, when the OK button is input via the input section 23, the CPU 21 returns to the abnormality information display screen of FIG. 18. Here, it is possible to select an appropriate countermeasure item based on a statistic of the past countermeasure item. In Embodiment 4, as a statistic, both the number of events and the percentage are displayed. However, the invention is not limited to that. Any one of the number of events and the percentage may be displayed, and the statistic may be displayed using a graph or the like. In addition, in Embodiment 4, both the statistic of the countermeasure item and the statistic of the cause of abnormality are displayed. However, either one of them may also be displayed.

The replacement part ID, the manipulation data, and the setup data and the abnormality data of the first to third sensors 291, 292, and 293 may also be displayed on the display section 24. The CPU 11 of the server computer 1 reads the countermeasure ID corresponding to the abnormality ID, the replacement part ID, the manipulation data, and the setup data and the abnormality data of the first to third sensors 291, 292, and 293 with reference to the countermeasure information DB 152. The CPU 11 transmits to the computer 2 the countermeasure ID, the replacement part ID, the manipulation data, and the setup data and the abnormality data of the first to third sensors 291, 292, and 293. On the display section 24, the CPU 21 of the computer 2 displays the received countermeasure ID, the received replacement part ID, the received manipulation data, the received setup data and abnormality data of the first to third sensors 291, 292, and 293.

Figure 27:
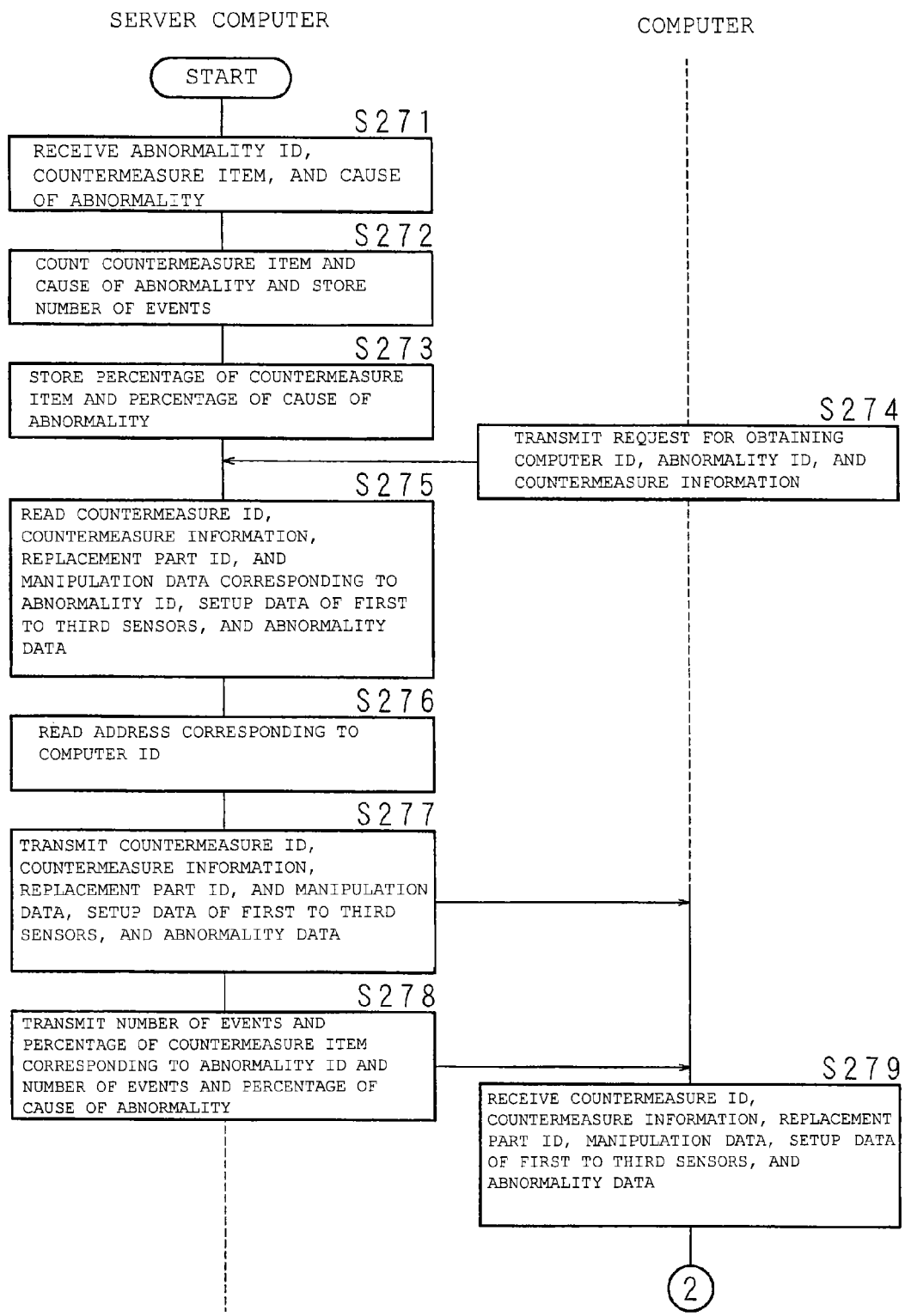
FIG. 27 is a flowchart illustrating a statistic display processing.
Figure 28:
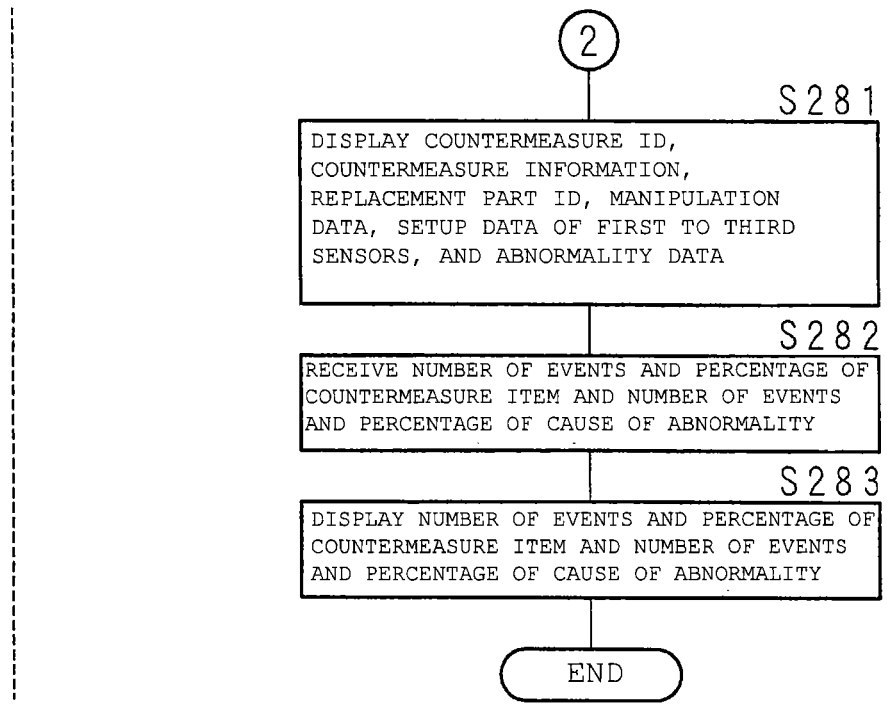
FIG. 28 is a flowchart illustrating a statistic display processing.

FIGS. 27 and 28 are flowcharts illustrating a statistic display processing. The CPU 11 receives the abnormality ID, the countermeasure item, and the cause of abnormality transmitted from the computer 2 (step S271). The CPU 11 counts the countermeasure item and the cause of abnormality relating to the abnormality ID with reference to the countermeasure information DB 152 and stores the counted number of events in the statistic DB 153 (step S272). In addition, the counting may be performed on a regular basis (for example, every one hour) or may be performed when the abnormality ID, the countermeasure item, and the cause of abnormality are transmitted from the computer 2. The CPU 11 computes the percentages of the countermeasure item and the cause of abnormality based on the counted number of events and stores the computed percentages in the statistic DB 153 (step S273).

The CPU 21 of the computer 2 receives an input of the countermeasure information display button 241 from the input section 23. When the input of the countermeasure information display button 241 is received, the CPU 21 transmits to the server computer 1 a request for acquiring the computer ID, the abnormality ID, and the countermeasure information (step S274).

The CPU 11 of the server computer 1 receives the request for acquiring the computer ID, the abnormality ID, the countermeasure information, the replacement part ID, the manipulation data, and the setup data and abnormality data of the first to third sensors 291, 292, and 293. The CPU 11 reads, from the countermeasure information DB 152, the countermeasure ID, the countermeasure information, the replacement part ID, and the manipulation data corresponding to the received abnormality ID, and the setup data and abnormality data of the first to third sensors 291, 292, and 293 (step S275). The CPU 11 reads an address corresponding to the received computer ID from the apparatus DB 151 (step S276). The CPU 11 transmits the countermeasure ID, the countermeasure information, the replacement part ID, the manipulation data, and the setup data and abnormality data of the first to third sensors 291, 292, and 293 to a computer 2 destined to the read address (step S277).

The CPU 11 reads the number of events and the percentage of the countermeasure item corresponding to the abnormality ID and the number of events and the percentage of the cause of abnormality from the statistic DB 153 and transmits them to the computer 2 (step S278). The CPU 21 of the computer 2 receives the countermeasure ID, the countermeasure information, the replacement part ID, the manipulation data, and the setup data and abnormality data of the first to third sensors 291, 292, and 293 (step S279).

On the display section 24, the CPU 21 displays the countermeasure ID, the countermeasure information, the received replacement part ID, the manipulation data, and the setup data and abnormality data of the first to third sensors 291, 292, and 293 together with the abnormality ID, the abnormality information, and the occurrence date/time (step S281). The CPU 21 receives the number of events and the percentage of the countermeasure item corresponding to the abnormality ID and the number of events and the percentage of the cause of abnormality (step S282). The CPU 21 displays the number of events and the percentage of the countermeasure item corresponding to the abnormality ID and the number of events and the percentage of the causes of abnormality on the display section 24 (step S283). As a result, it is possible to reference the statistic input from each computer 2 and select an appropriate countermeasure item from multiple countermeasure items. In addition, it is possible to select an appropriate countermeasure by referencing the statistic of the cause of abnormality.

In Embodiment 4, except for those described above, other structures are the same as those of Embodiments 1 to 3. Therefore, the same numerals apply to corresponding elements, and their descriptions are omitted.

Embodiment 5

In Embodiment 5, the countermeasure information is managed using preservation period information. FIG. 29 is an explanatory diagram illustrating a countermeasure information input screen. A user may input a preservation period of the countermeasure information via an input section 23. Alternatively, instead of the preservation period, a deletion date/time may be input. In Embodiment 5, it is assumed that a preservation period is input. The CPU 21 displays information for inputting the preservation period from the memory section 25. As illustrated in FIG. 29, the preservation period may include, for example, "PERMANENT" in which the countermeasure information corresponding to the abnormality ID is permanently stored, "YEAR/MONTH/DATE" in which the countermeasure information is stored to a predetermined date/time, and "NUMBER OF MONTHS" in which the countermeasure information is stored for a predetermined number of months. A user selects the "PERMANENT" from the input section 23 when it is considered that the countermeasure information is important, and it is necessary to store the countermeasure information for a long time. When a user thinks that the countermeasure information may be deleted after a predetermined period, a user inputs the date/time or the number of months desired for preservation from the input section 23.

The CPU 21 stores the preservation period input from the input section 23 in the countermeasure information file 252. FIG. 30 is an explanatory diagram illustrating a record layout of the countermeasure information file 252 according to Embodiment 5. Referring to FIG. 30, a preservation period field is newly provided. The CPU 21 stores the preservation period input via the input section 23 by matching the occurrence date/time and the abnormality ID. In the example of FIG. 30, the countermeasure information corresponding to the abnormality ID "1001" generated at 12:55:20, Sep. 16, 2010 is permanently stored.

The CPU 21 of the computer 2 transmits the preservation period corresponding to the occurrence date/time and the abnormality ID to the server computer 1 via the communication section 26. FIG. 31 is an explanatory diagram illustrating a record layout of the countermeasure information DB 152. In FIG. 31, a preservation period field is newly provided. The CPU 11 of the server computer 1 stores in the countermeasure information DB 152 the preservation period transmitted by matching the occurrence date/time and the abnormality ID. The CPU 11 deletes a record after the preservation period stored in the preservation period field elapses with reference to the date/time information output from the timepiece section 28. In addition, an operator may appropriately delete less important countermeasure information from the input section 13 or other non-illustrated computers.

Figure 32:
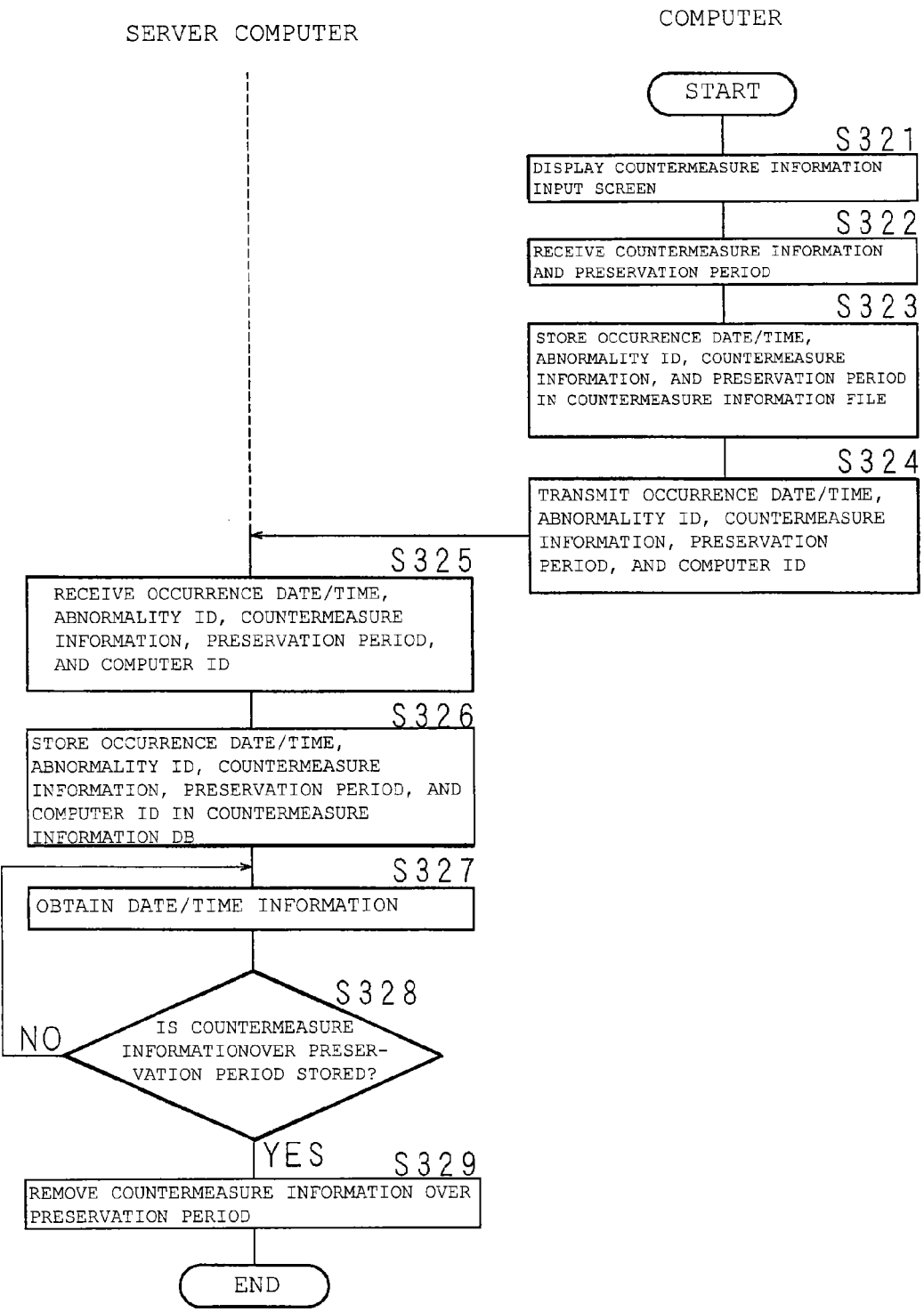
FIG. 32 is a flowchart illustrating a sequence of deletion processing.

FIG. 32 is a flowchart illustrating a sequence of the deletion processing. The CPU 21 displays the countermeasure information input screen on the display section 24 as illustrated in FIG. 29 (step S321). The CPU 21 receives the countermeasure information and the preservation period via the input section 23 (step S322). The CPU 21 stores in the countermeasure information file 252 the occurrence date/time, the abnormality ID, the countermeasure information, and the preservation period (step S323). The CPU 21 transmits to the server computer 1 the occurrence date/time, the abnormality ID, the countermeasure information, the preservation period, and the computer ID (step S324). The CPU 11 of the server computer 1 receives the occurrence date/time, the abnormality ID, the countermeasure information, the preservation period, and the computer ID (step S325).

In the countermeasure information DB 152, the CPU 11 stores the occurrence date/time, the abnormality ID, the countermeasure information, the preservation period, and the computer ID (step S326). The CPU 11 obtains the date/time information from the timepiece section 18 (step S327). The CPU 11 determines whether or not there is countermeasure information whose preservation period elapsed with reference to the date/time information and the preservation period field in the countermeasure information DB 152 (step S328). If it is determined that there is no countermeasure information whose preservation period elapsed (NO in step S328), the CPU 11 advances to step S327 and repeats the process. The countermeasure information whose preservation period is stored as "PERMANENT" may not be processed.

If it is determined that there is countermeasure information whose preservation period has elapsed (YES in step S328), the CPU 11 deletes the countermeasure information whose preservation period has elapsed (step S329). Specifically, a record containing the countermeasure information corresponding to the occurrence date/time and abnormality ID whose preservation period has elapsed is deleted from the countermeasure information DB 152. As a result, only more important countermeasure information and related data are provided to other computers 2, and it is possible to improve the efficiency of the countermeasure. In addition, when information is transmitted or received between the computers 2 as in Embodiment 2, the CPU 21 may delete a record relating to the countermeasure information whose preservation period has elapsed with reference to the preservation period field of the countermeasure information file and the date/time information output from the timepiece section 28.

In Embodiment 5, except for those described above, other structures are the same as those of Embodiments 1 to 4. Therefore, the same reference numerals apply to those corresponding elements, and their descriptions are omitted.

Embodiment 6

In Embodiment 6, the processing is performed based on a statistic of the countermeasure information. FIG. 33 is an explanatory diagram illustrating a record layout of the abnormality file 251 according to Embodiment 6. Referring to FIG. 33, an execution command field is newly provided. The execution command field contains an execution command for the film-forming apparatus 20 corresponding to the abnormality ID and the countermeasure item. For example, for the countermeasure item "RETRY," an execution command for lifting a stage again is stored in the stage control section 290. The CPU 21 outputs the execution command to the film-forming apparatus 20 via the communication port 294. The film-forming apparatus 20 performs control such that the stage control section 290 is lifted in response to the execution command.

For the countermeasure item "PROCESSING CONTINUED," for example, a command for continuing the processing by neglecting the abnormality information for the abnormality ID is output. The CPU 21 outputs a command for continuing the processing to the film-forming apparatus 20 via the communication port 294. The film-forming apparatus 20 continuously performs the next processing regardless of whether or not the first sensor 291 of the stage reacts. In addition, the countermeasure item "REBOOT," a command for turning off a power supply of the computer 2 and the film-forming apparatus 20 and turning them on again is output. The CPU 21 stops the power supply to the film-forming apparatus 20 and then executes the rebooting of the computer 2. The CPU 21 starts to supply power to the film-forming apparatus 20 after the rebooting.

The CPU 21 selects the countermeasure information having the greatest number of events or the highest percentage based on the statistic of Embodiment 4 and reads the execution command corresponding to the countermeasure item from the abnormality file 251. The CPU 21 performs a processing of the film-forming apparatus 20 based on the read execution command. For example, when the percentage of the countermeasure item "RETRY" is 95% or higher, the processing is executed based on the execution command relating to the "RETRY" when abnormality occurs.

Figure 34:
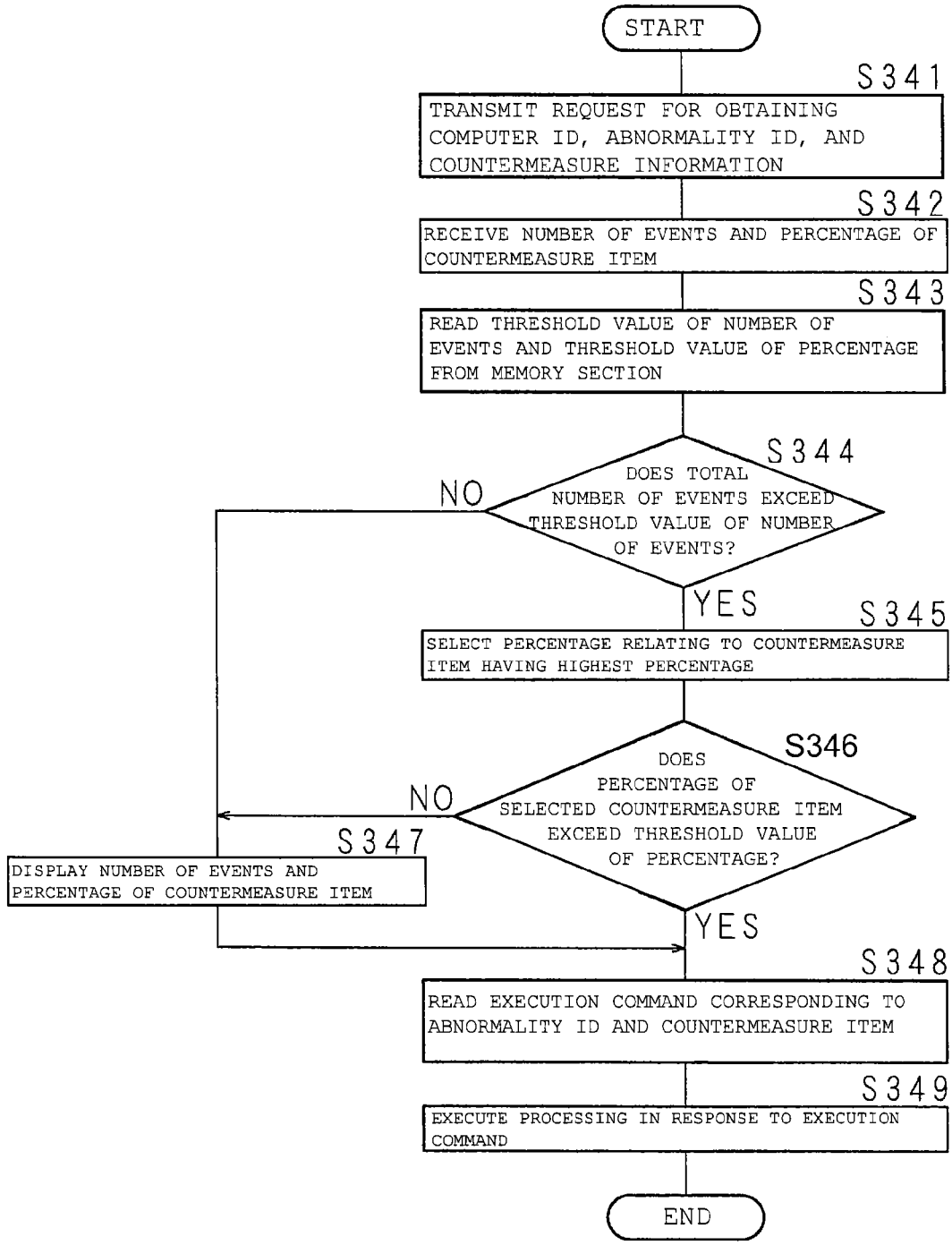
FIG. 34 is a flowchart illustrating a sequence of execution processing.

FIG. 34 is a flowchart illustrating an execution processing sequence. The CPU 21 transmits a request for acquiring the computer ID, the abnormality ID, and the countermeasure information to the server computer 1 as described in step S274 (step S341). As described in step S282, the CPU 21 receives the number of events and the percentage of each countermeasure item from the server computer 1 (step S342). The CPU 21 reads a threshold value of the number of events and a threshold value of the percentage stored in advance from the memory section 25 (step S343). The threshold value of the number of events is a value related to a total number of the events of overall countermeasure items and may be set to, for example, "30." The threshold value of the percentage is a value related to a percentage of the number of events of a certain countermeasure item against the number of events of overall countermeasure items and may be set to, for example, 90%.

The CPU 21 computes a total number of events of the countermeasure item received in step S342. The CPU 21 determines whether or not the total number of events exceeds a threshold value of the number of events read in step S343 (step S344). In Embodiment 6, it is assumed that the total number of events is compared with a threshold value of the number of events. However, the invention is not limited thereto. For example, a maximum number of events of the countermeasure item may be compared with the threshold value of the number of events. If it is determined that the total number of events exceeds the threshold value of the number of events (YES in step S344), the CPU 21 selects the highest percentage of the countermeasure item (step S345).

The CPU 21 determines whether or not the percentage of the selected countermeasure item exceeds the threshold value of the percentage read in step S343 (step S346). If it is determined that the percentage of the selected countermeasure item exceeds the threshold value of the percentage read in step S343 (YES in step S346), the CPU 21 advances the process to step S348. The threshold value described above may be changed by inputting an appropriate value using the input section 23.

If it is determined that the total number of events does not exceed the threshold value in step S344 (NO in step S344), or if it is determined that the percentage does not exceed the threshold value in step S346 (NO in step S346), the CPU 21 advances the process to step S347. The CPU 21 displays the number of events and the percentage of the countermeasure item on the display section 24 as in step S283 (step S347). If it is determined YES in step S346, the CPU 21 reads the execution command corresponding to the abnormality ID and the countermeasure item from the abnormality file 251 (step S348). The CPU 21 executes the processing for the computer 2 or the film-forming apparatus 20 in response to the read execution command (step S349). As a result, in the case of a highly reliable countermeasure item, even when abnormality occurs, it is possible to recover from an abnormal state to a normal state early by executing the corresponding processing.

In Embodiment 6, except for those described above, other structures are the same as those of Embodiments 1 to 5. Therefore, the same reference numerals apply to corresponding elements, and their descriptions are omitted.

Embodiment 7

In Embodiment 7, the countermeasure information is provided in the computer 2 having the film-forming apparatus 20. FIG. 35 is an explanatory diagram illustrating a record layout of the apparatus DB 151 according to Embodiment 7. Referring to FIG. 35, a classification field, an installation year/month/date field, and an operating time field are further provided. The classification field contains information for specifying a classification of the film-forming apparatus 20, such as a product number or a model name. In Embodiment 7, for the sake of simplified description, it is assumed that classifications "A," "B," and the like are stored.

The installation year/month/date field contains an installation year/month/date of the film-forming apparatus 20 together with the computer ID and the film-forming apparatus ID. The operating time field contains a total operating time of the film-forming apparatus 20 by matching the computer ID and the film-forming apparatus ID. It is assumed that the computer 2 transmits the operating time of the film-forming apparatus 20 to the server computer 1 on a regular basis. The CPU 11 of the server computer 1 stores in the operating time field a total sum of the operating time of the film-forming apparatus 20 after installation based on the operating time transmitted from the computer 2. The CPU 11 selects computers 2 having a possibility of generating the same abnormality based on a classification, an installation year/month/date or a total sum of the operating time. The CPU 11 selects another computer 2 having the same classification as that of one computer 2 and having an installation year/month/date different from that of the one computer 3 within a predetermined period (for example, one month) stored in the memory section 15.

In addition, the CPU 11 selects another computer 2 having the same classification as that of one computer 2 and having a total sum of the operating time different from that of the one computer 2 within a predetermined time (for example, 24 hours). In Embodiment 7, for example, it is assumed that a total sum of the operating time referred to in the latter case is employed. When the abnormality ID and the countermeasure information are transmitted from the one computer 2, the abnormality ID and the countermeasure information are transmitted to the selected computer 2.

FIG. 36 is an explanatory diagram illustrating an image of a warning screen. The CPU 11 of the server computer 1 reads the abnormality ID and the countermeasure information corresponding to the abnormality ID from the countermeasure information DB 152. The CPU 11 describes the read countermeasure information and the read abnormality ID as a hypertext markup language (HTML) document. The CPU 11 further describes access information for accessing detailed information corresponding to the abnormality ID on the HTML document. For example, the CPU 11 describes a uniform resource locator (URL) in which the abnormality ID is partially included. The CPU 11 transmits the warning information as described above to the computer 2 with reference to the address of the selected computer 2. The warning information of FIG. 36 is displayed on the display section 24 of the computer 2.

When a user manipulates the input section 23 to click the URL, a request for displaying the abnormality ID and the detailed information is transmitted to the server computer 1. The CPU 11 of the server computer 1 receives the request for displaying the abnormality ID and the detailed information. The CPU 11 transmits the countermeasure information corresponding to the abnormality ID, the sensor data, the manipulation data, the cause of abnormality, or the information on a replacement part to the computer 2 with reference to the countermeasure information DB 152.

Figure 37:
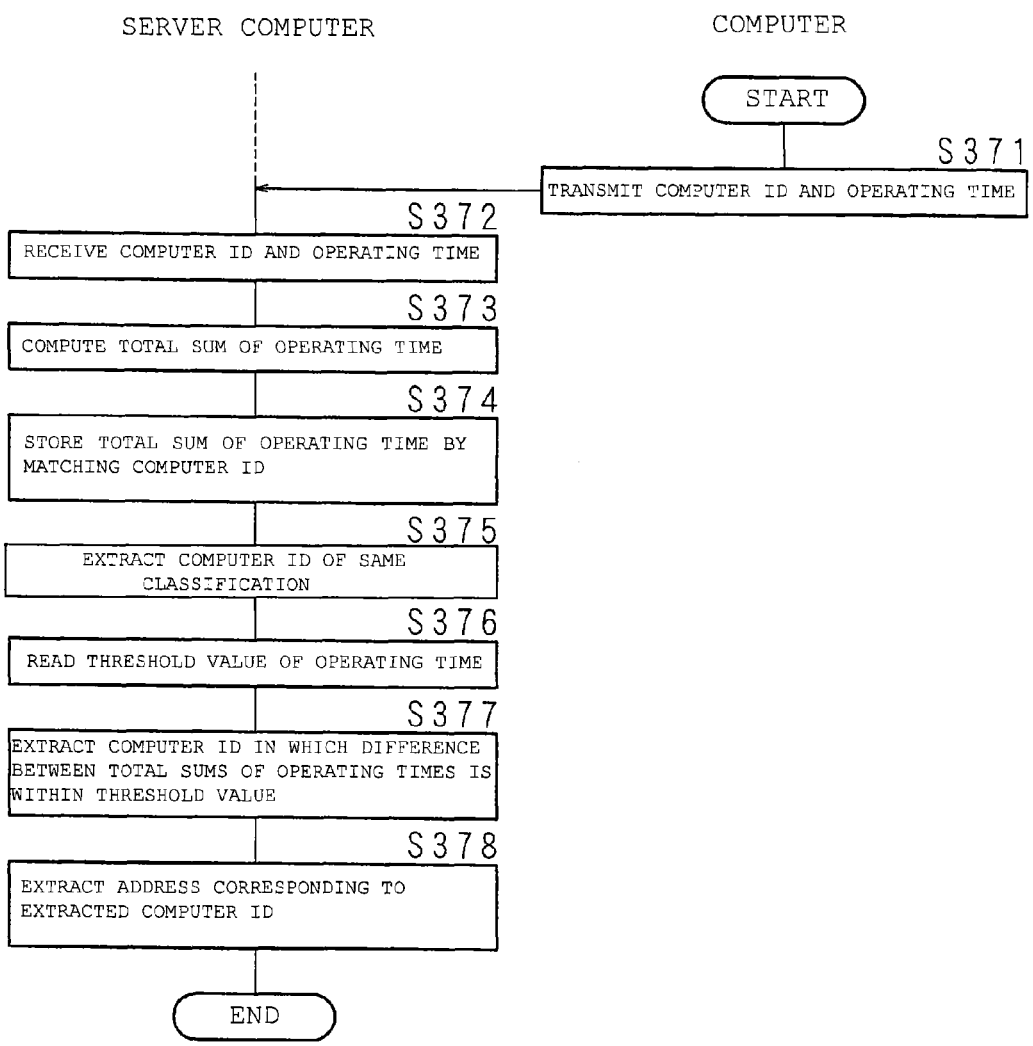
FIG. 37 is a flowchart illustrating a sequence of selection processing.

FIG. 37 is a flowchart illustrating a sequence of the selection process. The CPU 21 of the computer 2 transmits the computer ID and the operating time of the film-forming apparatus 20 (step S371). For example, the operating time may be obtained by counting time from a power-on state to a power-off state when a power source of the film-forming apparatus 20 is turned off. Alternatively, if a functionality of computing a total sum of the operating time from installation of the film-forming apparatus 20 is provided, the total sum may be used as the operating time. The CPU 11 of the server computer 1 receives the computer ID and the operating time (step S372). The CPU 11 computes a total sum of the operating time with reference to the operating time field of the apparatus DB 151 (step S373). Specifically, the CPU 11 adds the received operating time and the operating time contained in the operating time field.

The CPU 11 stores the total sum of the operating time by matching the computer ID (step S374). The CPU 11 selects computer IDs of the same classification with reference to the apparatus DB 151 (step S375). The CPU 11 reads the total sums of the operating times of the selected computer IDs from the apparatus DB 151. The CPU 11 reads a threshold value of the operating time from the memory section 15 (step S376). The CPU 11 compares a difference between the total sums of the operating times of two computer IDs with the threshold value and selects the computer IDs if the difference is smaller than the threshold value (step S377). The CPU 11 selects an address corresponding to the selected computer ID (step S378). As a result, it is possible to select the countermeasure ID having the same classification and approximately the same operating time.

Figure 38:
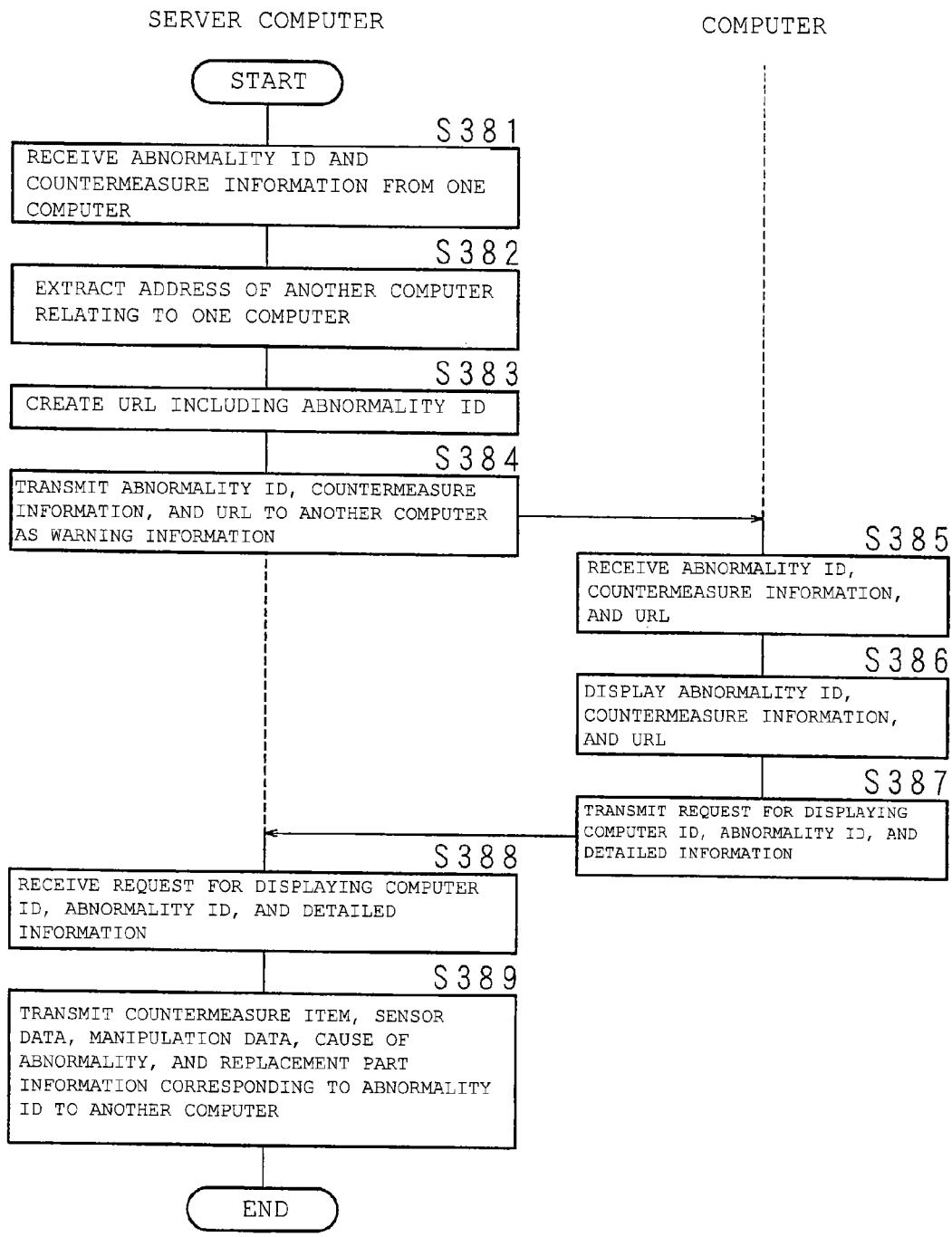
FIG. 38 is a flowchart illustrating a sequence of warning information display processing.

FIG. 38 is a flowchart illustrating a sequence of the warning information display processing. As described above, the CPU 11 of the server computer 1 receives the abnormality ID and the countermeasure information from one computer 2 (step S381). The CPU 11 selects an address of another computer 2 relating to the one computer 2 through the processing illustrated in FIG. 37 (step S382). The CPU 11 creates a URL including an abnormality ID for accessing the server computer 1 (step S383). The CPU 11 transmits the abnormality ID, the countermeasure information, and the URL to another computer 2 as warning information with reference to the address selected in step S382 (step S384).

The CPU 21 of another computer 2 receives the abnormality ID, the countermeasure information, and the URL (step S385). On the display section 24, the CPU 21 displays the abnormality ID, the countermeasure information, and the URL as warning information (step S386). The CPU 21 triggers a user's manipulation on the URL and transmits a request for displaying the computer ID, the abnormality ID, and detailed information to the server computer 1 (step S387). The CPU 11 of the server computer 1 receives the request for displaying the computer ID, the abnormality ID, and the detailed information (step S388).

The CPU 11 transmits information on the countermeasure item corresponding to the abnormality ID, the sensor data, the manipulation data, the cause of abnormality, and the replacement part to another computer 2 (step S389). In addition, statistics of the countermeasure item and the cause of abnormality may be transmitted together. On the display section 24, the CPU 21 of another computer 2 displays information on the countermeasure item corresponding to the abnormality ID, the sensor data, the manipulation data, the cause of abnormality, and the replacement part. As a result, even when no abnormality occurs, it is possible early to recognize strongly related abnormalities generated in the film-forming apparatus 20.

Embodiment 8

Figure 39:
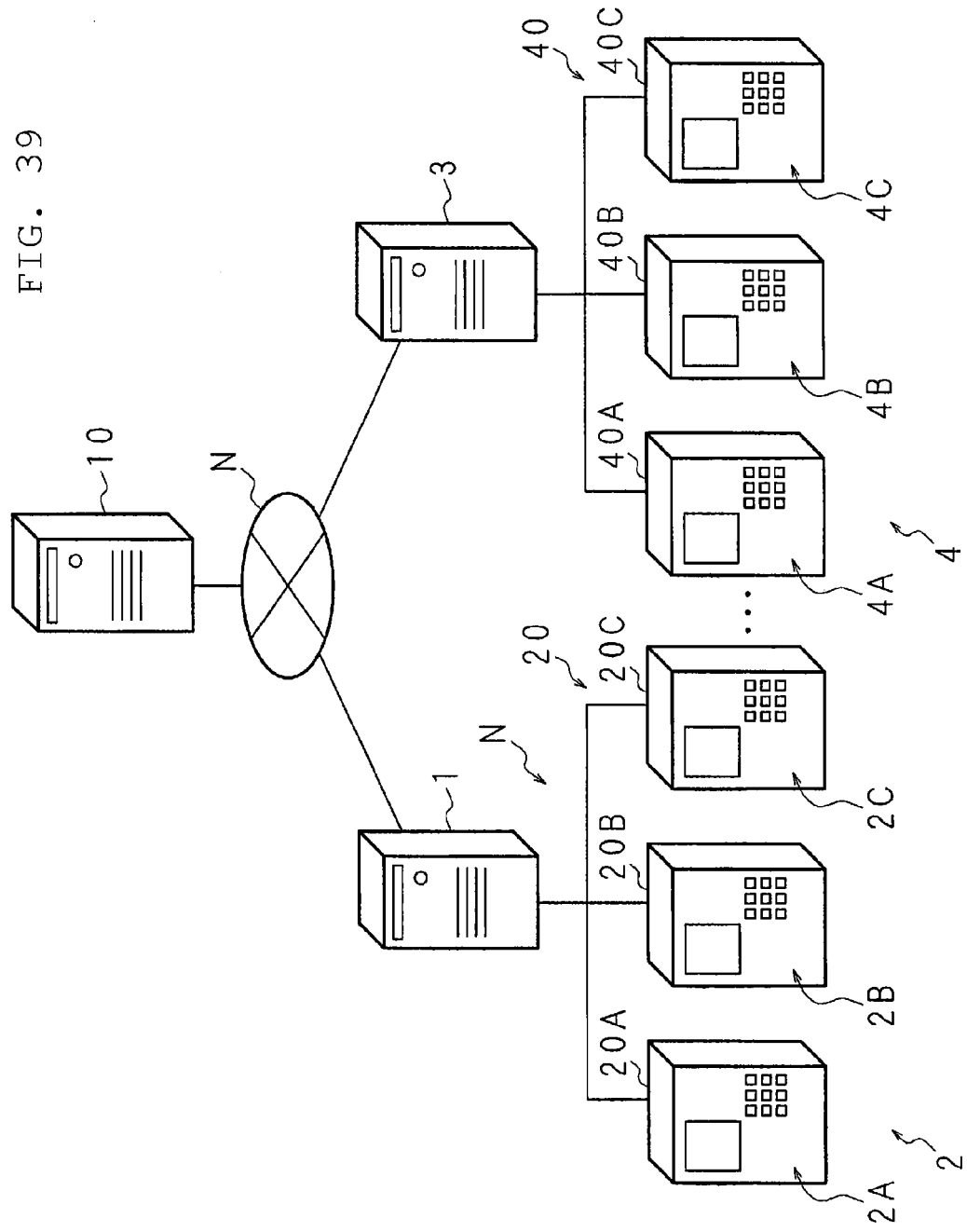
FIG. 39 is a schematic diagram illustrating a processing system according to Embodiment 8.

In Embodiment 8, information on multiple server computers 1 is shared. FIG. 39 is a schematic diagram illustrating a processing system according to Embodiment 8. In Embodiment 8, a server computer 3, a computer 4, and a film-forming apparatus 20 having the same structures as the server computer 1, the computer 2, and the film-forming apparatus 20 described in the aforementioned embodiments may be provided. The server computer 3 has multiple computers 4A, 4B, and 4C, and the computers 4A, 4B and 4C are embedded in the film-forming apparatuses 40A, 40B, and 40C (hereinafter represented as 40), respectively. The server computer 1 and the server computer 3 are connected to an integrated server computer 10 via a communication network N such as the Internet. In Embodiment 8, for the sake of simplified description, it is assumed that a pair of computers including the server computer 1 and the server computer 3 are employed. However, more film-forming apparatuses 20, more server computers 1, and more computers 2 may also be combined.

The content stored in the countermeasure information DB 152 described in conjunction with the server computer 1 is stored in the memory section (not illustrated) of the integrated server computer 10. Similarly, the countermeasure information DB (not illustrated) in the server computer 3 is also stored in the memory section of the integrated server computer 10. When a request for displaying the countermeasure information corresponding to the abnormality ID is transmitted from the computer 2 or 4, the server computer 1 or 3 transmits a request for displaying the abnormality ID and the countermeasure information to the integrated server computer 10. The integrated server computer 10 reads the countermeasure information corresponding to the abnormality ID from the countermeasure information received from each server computer 1, 3, . . . , and so on. The integrated server computer 10 transmits the countermeasure information to the server computer 1 or 3. The server computer 1 or 3 transmits the countermeasure information to the computer 2 or 4. In this manner, by sharing the countermeasure information DB using the integrated server computer 10, it is possible to share new information.

In Embodiment 8, except for those described above, other structures are the same as those of Embodiments 1 to 7. Therefore, the same reference numerals apply to corresponding elements, and their descriptions are omitted.

Embodiment 9

Figure 40:
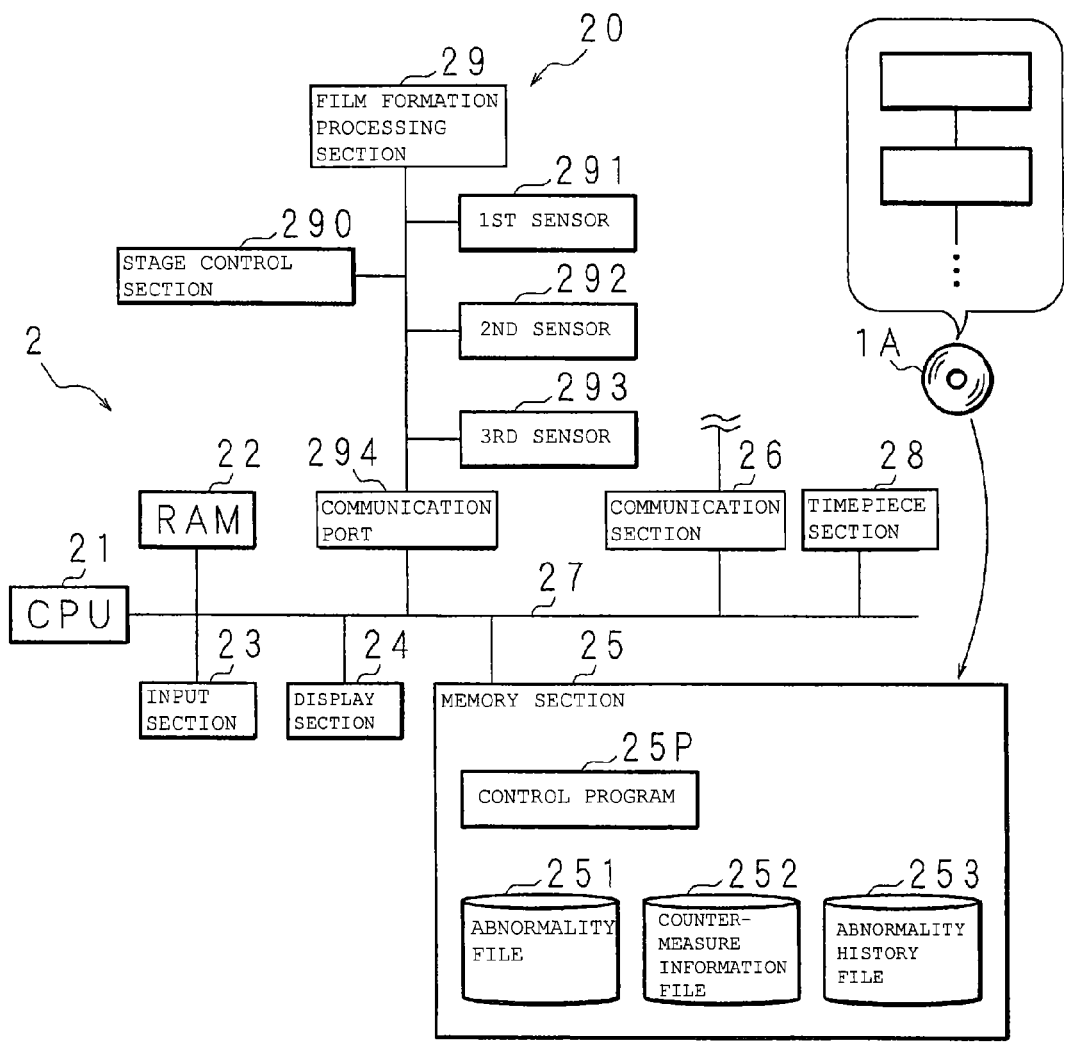
FIG. 40 is a block diagram illustrating a hardware group of a computer according to Embodiment 9.

FIG. 40 is a block diagram illustrating a hardware group of the computer 2 according to Embodiment 9. In Embodiment 9, a program for operating the computer 2 according to Embodiments 1 to 8 may be read by a reading section (not illustrated) using a USB memory or a portable recording medium 1A such as CD-ROM and be stored in the memory section 25. The program may be downloaded from other server computers (not illustrated) connected to a communication network N such as the Internet. Its details are described as follows.

The computer 2 of FIG. 40 downloads a program for executing various software processes described above from other server computers (not illustrated) using a portable recording medium 1A or using a communication network N. The program is installed as a control program 25P and is loaded on the RAM 22 for execution. As a result, the program serves as the computer 2 described above.

In Embodiment 9, except for those described above, other structures are the same as those of Embodiments 1 to 8. Therefore, the same reference numerals apply to corresponding elements, and their descriptions are omitted.

Embodiment 10

In Embodiment 10, a statistic regarding replacement parts is displayed. FIG. 41 is an explanatory diagram illustrating a record layout of a statistic DB 153 according to Embodiment 10. When the abnormality ID, the cause of abnormality, and the replacement part ID are transmitted from the computer 2, the CPU 11 of the server computer 1 stores the replacement part ID in the countermeasure information DB 152 by matching the abnormality ID and the cause of abnormality. The CPU 11 counts the number of replacement part IDs corresponding to the abnormality ID, the cause of abnormality, and the replacement part ID with reference to the countermeasure information DB 152. The CPU 11 stores the count number in the statistic DB 153 by matching the abnormality ID, the cause of abnormality, and the replacement part ID. In addition, the CPU 11 computes a percentage by subtracting the number of events of the abnormality ID, the cause of abnormality, and the replacement part ID from a total number of events of overall replacement part IDs corresponding to the cause of abnormality and multiplying the result by 100. The CPU 11 stores the computed percentage by matching the number of events. In addition, a description of the record such as the countermeasure information is omitted intentionally for want of space.

Figure 42:
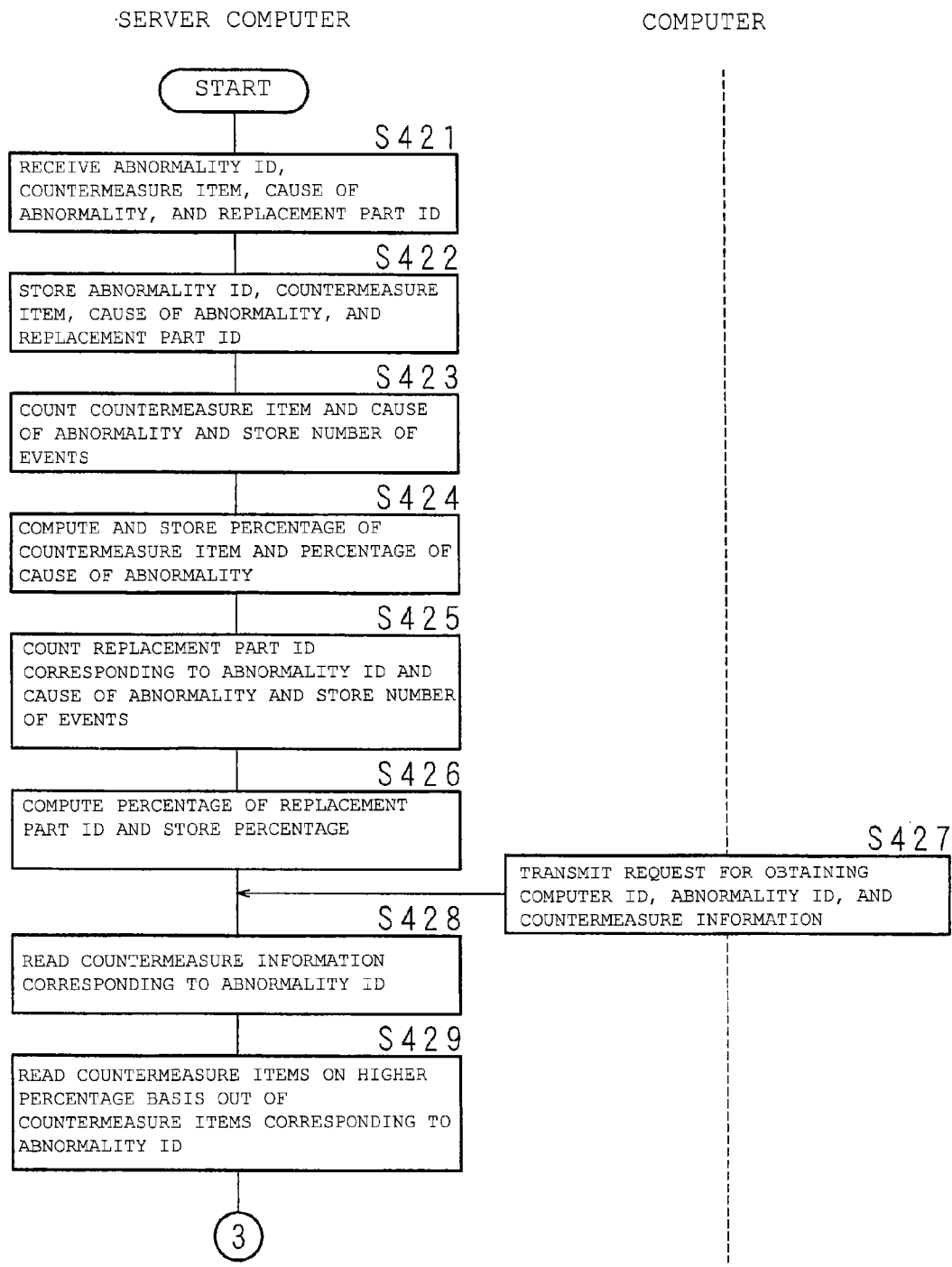
FIG. 42 is a flowchart illustrating a sequence of statistic display processing.

FIGS. 42 and 43 are flowcharts illustrating a sequence of the statistic display processing. The CPU 11 receives the abnormality ID, the countermeasure item, the cause of abnormality, and the replacement part ID transmitted from the computer 2 (step S421). In addition, a description is omitted for the manipulation data, the sensor data, and the like. The CPU 11 stores the abnormality ID, the countermeasure item, the cause of abnormality, and the replacement part ID in the countermeasure information DB 152 (step S422). The CPU 11 counts the cause of abnormality and the countermeasure item corresponding to the abnormality ID with reference to the countermeasure item DB 152 and stores the number of events in the statistic DB 153 (step S423). Specifically, the CPU 11 selects the countermeasure items corresponding to the abnormality ID and counts the number of countermeasure items. The CPU 11 stores the counted number in the statistic DB 153 by matching the abnormality ID and the countermeasure item. In addition, the CPU 11 may increment the number of events corresponding to the countermeasure item and the abnormality ID of the statistic DB 153 when the countermeasure item corresponding to the abnormality ID is received.

The CPU 11 selects the cause of abnormality corresponding to the abnormality ID with reference to the countermeasure information DB 152 and counts the number of causes of abnormality. The CPU 11 stores the counted number in the statistic DB 153 by matching the abnormality ID and the cause of abnormality. In addition, when the cause of abnormality corresponding to the abnormality ID is received, the CPU 11 may increment the number of events corresponding to the abnormality ID and the cause of abnormality of the statistic DB 153. The CPU 11 computes the percentage of the countermeasure item and the percentage of the cause of abnormality with reference to the statistic DB 153 and stores them in the statistic DB 153 (step S424). Specifically, the CPU 11 computes the percentage by subtracting the number of events of the countermeasure item corresponding to the abnormality ID from the number of events of overall countermeasure item corresponding to the abnormality ID and multiplying the result by 100. The CPU 11 stores the computed percentage in the statistic DB 153 by matching the countermeasure item corresponding to the abnormality ID. Similarly, the CPU 11 computes the percentage by subtracting the number of events of the cause of abnormality corresponding to the abnormality ID from the number of events of overall causes of abnormality corresponding to the abnormality ID and multiplying the result by 100. The CPU 11 stores the computed percentage in the statistic DB 153 by matching the cause of abnormality corresponding to the abnormality ID.

The CPU 11 counts the number of replacement part IDs corresponding to the abnormality ID and the cause of abnormality with reference to the countermeasure information DB 152 and stores the number of events in the statistic DB 153 (step S425). Specifically, the CPU 11 selects the replacement part ID satisfying the abnormality ID and the cause of abnormality with an AND-condition and counts the number of the selected replacement part IDs. The CPU 11 stores the counted number in the statistic DB 153 by matching the abnormality ID and the cause of abnormality. In addition, when the replacement part ID corresponding to the abnormality ID and the cause of abnormality is received, the CPU 11 may increment the number of events corresponding to the abnormality ID and the cause of abnormality of the statistic DB 153. The CPU 11 computes a percentage of the replacement part ID with reference to the statistic DB 153 and stores the percentage in the statistic DB 153 (step S426). Specifically, the CPU 11 computes the percentage by subtracting the number of one replacement part ID satisfying the abnormality ID and the cause of abnormality with an AND-condition from the number of overall replacement part IDs satisfying the same condition and multiplying the result by 100. The CPU 11 stores the computed percentage in the statistic DB 153 by matching the abnormality ID, the cause of abnormality, and the replacement part ID. By repeating the aforementioned processing, the number of events and the percentage of the replacement part ID corresponding to the abnormality ID and the cause of abnormality are accumulated.

The CPU 21 of the computer 2 receives an input of the countermeasure information display button 241 from the input section 23. As the input of the countermeasure information display button 241 is received, the CPU 21 transmits a request for acquiring the computer ID, the abnormality ID, and the countermeasure information to the server computer 1 (step S427).

The CPU 11 of the server computer 1 receives the request for acquiring the computer ID, the abnormality ID, and the countermeasure information. The CPU 11 reads the countermeasure information corresponding to the received abnormality ID from the countermeasure information DB 152 (step S428). The CPU 11 reads several countermeasure items out of the multiple countermeasure items corresponding to the abnormality ID from the statistic DB 153 on a higher percentage basis (step S429). For example, three countermeasure items having the highest percentage may be read. Alternatively, the countermeasure items having the percentage equal to or higher than a predetermined value (for example, 20% or higher) may be read. Although the percentage is selected and displayed in Embodiment 8, the invention is not limited to that. Instead of the percentage, the countermeasure items may be read on a greater number-of-events basis. In this case, three countermeasure items having the greatest number of events may be read. Alternatively, the countermeasure items may be read on both a higher percentage basis and a greater number-of-events basis.

The CPU 11 reads multiple causes of abnormality out of the causes of abnormality corresponding to the received abnormality ID from the statistic DB 153 on a higher percentage basis (step S431). The CPU 11 reads multiple replacement part IDs out of the replacement part IDs for the abnormality ID and the read cause of abnormality from the statistic DB 153 on a higher percentage basis (step S432). The CPU 11 determines whether or not the reading of the replacement part ID for overall causes of abnormality read in step S432 is terminated (step S433). If it is determined that the reading is not terminated (NO in step S433), the CPU 11 returns the process to step S432. As a result, the replacement part IDs for multiple causes of abnormality are read. If it is determined that the processing for overall causes of abnormality is terminated (YES in step S433), the CPU 11 advances the process to step S434.

The CPU 11 reads the address corresponding to the computer ID received from the apparatus DB 151 (step S434). The CPU 11 transmits the countermeasure information corresponding to the abnormality ID, multiple countermeasure items and percentages, multiple causes of abnormality and percentages, and multiple replacement part IDs, corresponding parts names, and percentages to the computer 2 corresponding to the read address (step S435). In addition, the CPU 11 selects a part name corresponding to the replacement part ID with reference to the memory section 15 in which part names corresponding to the replacement part IDs are stored in advance.

The CPU 21 of the personal computer 2 receives the countermeasure information, multiple countermeasure items and their percentages, multiple causes of abnormality and their percentages, and multiple replacement part IDs and part names and their percentages via a communication section 26 (step S436). On the display section 24, the CPU 21 displays the countermeasure information, multiple countermeasure items and their percentages, multiple causes of abnormality and their percentages, and multiple replacement part IDs and their percentages (step S437).

FIG. 44 is an explanatory diagram illustrating a display image of countermeasure information. The CPU 21 displays the countermeasure item, the cause of abnormality, and the replacement part ID in addition to the countermeasure information. The CPU 21 displays multiple countermeasure items in a descending order. In Embodiment 10, the CPU 11 of the server computer 1 reads the countermeasure items in a descending order on a higher percentage basis. However, the invention is not limited to that. Multiple countermeasure items may be displayed on the display section 24 on a higher percentage basis in a descending order by sorting multiple countermeasure items and their percentages received by the CPU 21 of the personal computer 2 on a higher percentage basis.

Similarly, the CPU 21 displays the causes of abnormality on the display section 24 in a descending order on a higher percentage basis. In the example of FIG. 44, "MECHANICAL PARTS FAILURE" having the highest percentage of 65% is displayed first, and "ELECTRICAL PARTS FAILURE" having the next highest percentage of 30% is displayed on the lower side or the right side. For want of space, a description of the causes of abnormality having the lower percentage is not provided. The CPU 21 displays part names and replacement part IDs in a descending order on a higher percentage basis for each cause of abnormality. In the example of FIG. 44, for "MECHANICAL PARTS FAILURE," a part A having the highest percentage of 80% is displayed first, and a part B having the next highest percentage of 10% is then displayed, for example, on the lower side or the right side. Subsequently, a part C having the next highest percentage of 5% is displayed. In this manner, since the countermeasure items and the causes of abnormality are displayed together with the percentages in a descending order on a percentage basis, it is possible to take an appropriate countermeasure. In addition, the part names to be replaced are displayed together with percentages for each cause of abnormality, allowing appropriate orders to be placed long in advance.

In Embodiment 10, except for those described above, other structures are the same as those of Embodiments 1 to 9. Therefore, the same reference numerals apply to corresponding elements, and their descriptions are omitted.

When there is no information to be provided to a vendor-side computer, it is difficult to provide appropriate information in the field. In this case, as a result, an operator is necessary to directly take a countermeasure in the field, which leaves a heavy burden.

In the information processing apparatus according to an embodiment of the invention, the countermeasure information is transmitted to and shared by other computers when a countermeasure is taken for an abnormality. Therefore, it is possible to accumulate various types of know-how and provide a user with a more appropriate countermeasure.

According to an aspect of the invention, there is provided an information processing apparatus that processes information on a semiconductor treatment apparatus, including: a display section structured to display information on an abnormality when the abnormality occurs in a semiconductor treatment apparatus; a receiving section structured to receive countermeasure information on a countermeasure for the abnormality; a memory section structured to store the received countermeasure information by matching abnormality identification information for identifying the abnormality; an output section structured to output the countermeasure information and the abnormality identification information to the outside via a communication section; a display section structured to display multiple countermeasure item candidates when an abnormality occurs; an item storing section structured to store a countermeasure item selected from the multiple displayed countermeasure item candidates by matching abnormality identification information; an item transmitting section structured to transmit the countermeasure information and the abnormality identification information stored in the item storing section to the outside via the communication section; an item receiving section structured to receive a statistic regarding the countermeasure item corresponding to the abnormality identification information transmitted from the outside; and an item statistic display section structured to display a statistic regarding a countermeasure item for the received abnormality identification information when an abnormality occurs.

The information processing apparatus according to an aspect of the invention further includes: an acquisition section structured to acquire countermeasure information corresponding to abnormality identification information when an abnormality occurs; and a countermeasure information display section structured to display countermeasure information corresponding to the abnormality identification information obtained by the acquisition section.

In the information processing apparatus according to an aspect of the invention, the acquisition section has a transmitting section structured to transmit the abnormality identification information to the outside via the communication section when an abnormality occurs, and a receiving section structured to receive countermeasure information corresponding to the abnormality identification information transmitted from the outside.

The information processing apparatus according to an aspect of the invention further includes: a cause display section structured to display multiple cause-of-abnormality candidates; a cause storing section structured to store a cause of abnormality selected from the multiple cause-of-abnormality candidates displayed on the cause display section by matching the abnormality identification information; and a transmitting section structured to transmit the cause of abnormality and the abnormality identification information stored in the cause storing section to the outside via the communication section.

The information processing apparatus according to an aspect of the invention further includes: a cause receiving section structured to receive a statistic regarding the cause of abnormality corresponding to the abnormality identification information; and a statistic display section structured to display a statistic regarding the cause of abnormality corresponding to the received abnormality identification information relating to the abnormality.

In the information processing apparatus according to an aspect of the invention, the statistic includes counts or percentages of multiple causes of abnormality corresponding to the abnormality identification information, and the statistic display section is structured to display multiple causes of abnormality corresponding to the received abnormality identification information as the abnormality occurs, and counts or percentages of each cause of abnormality in a descending order.

In the information processing apparatus according to an aspect of the invention, the receiving section is structured to receive the countermeasure information to cope with the generated abnormality and preservation period information of the countermeasure information, and the output section outputs the stored abnormality identification information, the stored countermeasure information and the stored preservation period information to another computer.

According to another aspect of the invention, there is provided a semiconductor treatment system including: multiple information processing apparatuses that process information on a semiconductor treatment apparatus; and a server computer connected to the mutiple information processing apparatuses via a communication network. One information processing apparatus has a display section structured to display information on an abnormality when the abnormality occurs in the semiconductor treatment apparatus, a receiving section structured to receive countermeasure information regarding a countermeasure for the abnormality, a memory section structured to store the received countermeasure information by matching abnormality identification information for identifying the abnormality, an output section structured to output the stored countermeasure information and the stored abnormality identification information to the server computer, an item display section structured to display multiple countermeasure item candidates as an abnormality occurs, an item storing section structured to store a countermeasure item selected from the multiple displayed countermeasure items by matching the abnormality identification information, and an item transmitting section structured to transmit the countermeasure item and the abnormality identification information stored in the item storing section to the server computer via the communication network. The server computer has an information storing section structured to store the abnormality identification information and the countermeasure information transmitted from the one information processing apparatus, a reading section structured to read countermeasure information corresponding to the abnormality identification information stored in the information storing section, a transmitting section structured to transmit countermeasure information corresponding to the read abnormality identification information to another information processing apparatus, a countermeasure item storing section structured to store the countermeasure item and the abnormality identification information transmitted from the one information processing apparatus, a statistic generating section structured to generate a statistic regarding the countermeasure item corresponding to the abnormality identification information based on the countermeasure item corresponding to multiple pieces of the abnormality identification information stored in the countermeasure item storing section, and a statistic transmitting section structured to transmit a statistic regarding the countermeasure item corresponding to the abnormality identification information generated by the statistic generating section to the other information processing apparatus. The other information processing apparatus has a receiving section structured to receive countermeasure information corresponding to the abnormality identification information transmitted from the server computer, a countermeasure information display section structured to display the countermeasure information received by the receiving section, an item receiving section structured to receive a statistic regarding the countermeasure item corresponding to the abnormality identification information transmitted from the server computer, and an item statistic display section structured to display a statistic regarding the countermeasure item corresponding to the received abnormality identification information as the abnormality occurs.

In the semiconductor treatment system according to an aspect of the invention, the receiving section receives the countermeasure information for the generated abnormality and the preservation period information of the countermeasure information, the output section outputs the stored abnormality identification information, the stored countermeasure information, and the stored preservation period information to the server computer, and the server computer has a period storing section structured to store the abnormality identification information, the countermeasure information, and the preservation period information output from the one information processing apparatus, and an elimination section structured to eliminate the countermeasure information of the abnormality identification information whose preservation period elapses based on the preservation period information.

According to another aspect of the invention, there is provided a method of processing information on a semiconductor treatment apparatus using an information processing apparatus having a control section, including: displaying information on an abnormality as the abnormality occurs in the semiconductor treatment apparatus; receiving countermeasure information regarding a countermeasure for the abnormality using the control section; by using the control section, storing the received countermeasure information by matching abnormality identification information for identifying the abnormality; outputting the stored abnormality identification information and the stored countermeasure information to the outside via a communication section; displaying multiple countermeasure item candidates using the control section as the abnormality occurs; storing the countermeasure item selected from the multiple displayed countermeasure item candidates by matching the abnormality identification information; transmitting the stored abnormality identification information and the stored countermeasure item to the outside via the communication section; receiving a statistic regarding the countermeasure item corresponding to the abnormality identification information transmitted from the outside; and displaying a statistic regarding the countermeasure item for the received abnormality identification information relating to the received abnormality using the control section when an abnormality occurs.

According to still another aspect of the invention, there is provided a program that processes information on a semiconductor treatment apparatus using a computer having a control section and a display section, whereby the program causes the computer to execute steps of: causing the control section to display abnormality information when an abnormality occurs in the semiconductor treatment apparatus; causing the control section to receive countermeasure information regarding a countermeasure for the abnormality; causing the control section to store the received countermeasure information by matching abnormality identification information for identifying the generated abnormality; outputting the stored abnormality identification information and the stored countermeasure information to the outside via a communication section; causing the control section to display multiple countermeasure item candidates as the abnormality occurs; storing the countermeasure item selected from the multiple displayed countermeasure item candidates by matching the abnormality identification information; transmitting the stored abnormality identification information and the stored countermeasure item to the outside via the communication section; receiving a statistic regarding the countermeasure item corresponding to the abnormality identification information transmitted from the outside; and causing the control section to display a statistic regarding the countermeasure item for the received abnormality identification information as the abnormality occurs.

In the apparatus according to an aspect of the invention, even when an abnormality occurs, by accumulating and sharing countermeasure information obtained when a countermeasure is taken, it is possible to accumulate know-how to cope with an abnormality and provide a user with an appropriate countermeasure.

Obviously, numerous modifications and variations of the present invention are possible in light of the above teachings. It is therefore to be understood that within the scope of the appended claims, the invention may be practiced otherwise than as specifically described herein.

What is claimed is:

1. An information processing apparatus for processing information on a semiconductor treatment apparatus, comprising:
   an abnormality information display device configured to display information on an abnormality when the abnormality occurs in a semiconductor treatment apparatus;
   a countermeasure information receiving device configured to receive countermeasure information on a countermeasure to the abnormality;
   a countermeasure information storing device configured to store the countermeasure information such that the countermeasure information is matched with abnormality identification information for identifying the abnormality;
   an output device configured to output the countermeasure information and the abnormality identification information stored in the countermeasure information storing device via a communication device to the outside;
   a countermeasure item display device configured to display a plurality of countermeasure item candidates when the abnormality occurs;
   a countermeasure item storing device configured to store a countermeasure item selected from the plurality of countermeasure item candidates displayed on the countermeasure item display device such that the countermeasure item is matched with the abnormality identification information;
   a countermeasure item transmitting device configured to transmit the countermeasure item and the abnormality identification information stored in the countermeasure item storing device via the communication device to the outside;
   a countermeasure item statistic receiving device configured to receive a statistic regarding the countermeasure item corresponding to the abnormality identification information transmitted from the outside; and
   a countermeasure item statistic display device configured to display the statistic regarding the countermeasure item for the abnormality identification information received by the countermeasure item statistic receiving device when the abnormality occurs.

2. The information processing apparatus according to claim 1, further comprising:
   a countermeasure information acquiring device configured to acquire the countermeasure information corresponding to the abnormality identification information when the abnormality occurs; and
   a countermeasure information display device configured to display the countermeasure information corresponding to the abnormality identification information obtained by the countermeasure information acquiring device.

3. The information processing apparatus according to claim 2, wherein the countermeasure information acquiring device has an abnormality identification information transmitting device configured to transmit the abnormality identification information to the outside via the communication device when the abnormality occurs, and a countermeasure information receiving device configured to receive the countermeasure information corresponding to the abnormality identification information transmitted from the outside.

4. The information processing apparatus according to claim 3, further comprising:
   a cause-of-abnormality display device configured to display a plurality of cause-of-abnormality candidates;
   a cause-of-abnormality storing device configured to store a cause of abnormality selected from the plurality of cause-of-abnormality candidates displayed on the cause-of-abnormality display device such that the cause of abnormality is matched with the abnormality identification information; and
   a cause-of-abnormality transmitting device configured to transmit the cause of abnormality and the abnormality identification information stored in the cause-of-abnormality storing device to the outside via the communication device.

5. The information processing apparatus according to claim 4, further comprising:
   a cause-of-abnormality statistic receiving device configured to receive a statistic of the cause of abnormality corresponding to the abnormality identification information; and
   a cause-of-abnormality statistic display device configured to display the statistic of the cause of abnormality corresponding to the abnormality identification information received by the cause-of-abnormality statistic receiving device when the abnormality occurs.

6. The information processing apparatus according to claim 5, wherein the statistic regarding the cause of abnormality corresponding to the abnormality identification information includes a count or a percentage of a plurality of causes of abnormality corresponding to the abnormality identification information, and the cause-of-abnormality statistic display device is configured to display the plurality of causes of abnormality corresponding to the abnormality identification information received by the cause-of-abnormality statistic receiving device when the abnormality occurs and to display the count or percentage of each of the causes of abnormality in a descending order.

7. The information processing apparatus according to claim 1, wherein the countermeasure information receiving device is configured to receive the countermeasure information and preservation period information of the countermeasure information, and the output device is configured to output the abnormality identification information, the countermeasure information, and the preservation period information stored in the countermeasure information storing device to at least one other computer.

8. The information processing apparatus according to claim 1, further comprising a countermeasure information acquiring device configured to acquire the countermeasure information corresponding to the abnormality identification information when the abnormality occurs.

9. The information processing apparatus according to claim 8, wherein the countermeasure information acquiring device has an abnormality identification information transmitting device configured to transmit the abnormality identification information to the outside via the communication device when the abnormality occurs, and a countermeasure information receiving device configured to receive the countermeasure information corresponding to the abnormality identification information transmitted from the outside.

10. A semiconductor treatment system, comprising:
a semiconductor treatment apparatus;
a plurality of information processing apparatuses for processing information on the semiconductor treatment apparatus; and
a server computer connected to the plurality of information processing apparatuses via a communication network,
wherein the plurality of information processing apparatuses includes a first information processing apparatus and a second information processing apparatus, the first information processing apparatus has an abnormality information display device configured to display information on an abnormality when the abnormality occurs in the semiconductor treatment apparatus, a countermeasure information receiving device configured to receive countermeasure information regarding a countermeasure for the abnormality, a countermeasure information storing device configured to store the countermeasure information such that the countermeasure information is matched with abnormality identification information for identifying the abnormality, an output device configured to output the countermeasure information and the abnormality identification information stored in the countermeasure information storing device to the server computer via the communication network, a countermeasure item display device configured to display a plurality of countermeasure item candidates when the abnormality occurs, a countermeasure item storing device configured to store a countermeasure item selected from the plurality of countermeasure item candidates displayed on the countermeasure item display device such that the countermeasure item is matched with the abnormality identification information, and a countermeasure item transmitting device configured to transmit the countermeasure item and the abnormality identification information stored in the countermeasure item storing device to the server computer via the communication network,
the server computer has a server computer countermeasure information storing device configured to store the abnormality identification information and the countermeasure information transmitted from the first information processing apparatus, a countermeasure information reading device configured to read the countermeasure information corresponding to the abnormality identification information stored in the information storing device, a countermeasure information transmitting device configured to transmit the countermeasure information corresponding to the abnormality identification information read by the countermeasure information reading device to the second information processing apparatus, a countermeasure item storing device configured to store the countermeasure item and the abnormality identification information transmitted from the first information processing apparatus, a statistic generating device configured to generate a statistic regarding the countermeasure item corresponding to the abnormality identification information based on a plurality of countermeasure items corresponding to abnormality identification information data stored in the countermeasure item storing device, and a statistic transmitting device configured to transmit the statistic regarding the countermeasure item corresponding to the abnormality identification information generated by the statistic generating device to the second information processing apparatus, and
the second information processing apparatus has a countermeasure information receiving device configured to receive the countermeasure information corresponding to the abnormality identification information transmitted from the server computer, a countermeasure information display device configured to display the countermeasure information received by the receiving device, a countermeasure item statistic receiving device configured to receive the statistic regarding the countermeasure item corresponding to the abnormality identification information transmitted from the server computer, and a countermeasure item statistic display device configured to display the statistic regarding the countermeasure item for the abnormality identification information received by the countermeasure item statistic receiving device when the abnormality occurs.

11. The semiconductor treatment system according to claim 10, wherein the countermeasure information receiving device is configured to receive the countermeasure information and preservation period information of the countermeasure information, the output device is configured to output the abnormality identification information, the countermeasure information, and the preservation period information stored in the countermeasure information storing device to the server computer, and the server computer has a preservation period storing device configured to store the abnormality identification information, the countermeasure information, and the preservation period information output from the first information processing apparatus, and an elimination device configured to eliminate the countermeasure information of the abnormality identification information whose preservation period has elapsed based on the preservation period information.

12. The semiconductor treatment system according to claim 10, wherein the first treatment apparatus has a countermeasure information acquiring device configured to acquire the countermeasure information corresponding to the abnormality identification information when the abnormality occurs, and a countermeasure information display device configured to display the countermeasure information corresponding to the abnormality identification information acquired by the countermeasure information acquiring device.

13. The semiconductor treatment system according to claim 12, wherein the countermeasure information acquiring device has an abnormality identification information transmitting device configured to transmit the abnormality identification information to the server computer via the communication network when the abnormality occurs, and a countermeasure information receiving device configured to receive the countermeasure information corresponding to the abnormality identification information transmitted from the server computer.

14. The semiconductor treatment system according to claim 10, wherein the first treatment apparatus has a cause-of-abnormality display device configured to display a plurality of cause-of-abnormality candidates, a cause-of-abnormality storing device configured to store a cause of abnormality selected from the plurality of cause-of-abnormality candidates displayed on the cause-of-abnormality display device such that the cause of abnormality is matched with the abnormality identification information, and a cause-of-abnormality transmitting device configured to transmit the abnormality identification information and the cause of abnormality stored in the cause-of-abnormality storing device to the server computer via the communication network.

15. The semiconductor treatment system according to claim 14, further comprising:
a cause-of-abnormality statistic receiving device configured to receive a statistic regarding the cause of abnormality corresponding to the abnormality identification information; and
a cause-of-abnormality statistic display device configured to display the statistic regarding the cause of abnormality corresponding to the abnormality identification information received by the cause-of-abnormality statistic receiving device when the abnormality occurs.

16. The semiconductor treatment system according to claim 15, wherein the statistic regarding the cause of an abnormality corresponding to the abnormality identification information includes a count or a percentage of a plurality of causes of abnormality corresponding to the abnormality identification information, and the cause-of-abnormality statistic display device is configured to display the plurality of causes of abnormality corresponding to the abnormality identification information received by the cause-of-abnormality statistic receiving device when the abnormality occurs and to display the count or percentage of each of the causes of abnormality in a descending order.

17. A non-transitory computer-readable medium including a program, which when executed by the information processing apparatus according to claim 1, causes the information processing apparatus to:
instruct the abnormality information display device to display the abnormality information when the abnormality occurs in the semiconductor treatment apparatus;
instruct the countermeasure information receiving device to receive the countermeasure information regarding the countermeasure for the abnormality;
instruct the countermeasure information storing device to store the countermeasure information such that the countermeasure information is matched with the abnormality identification information for identifying the abnormality;
instruct the output device to output the abnormality identification information and the countermeasure information stored in the countermeasure information storing device to the outside via the communication device;
instruct the countermeasure item display device to display the plurality of countermeasure item candidates when the abnormality occurs;
instruct the countermeasure item storing device to store the countermeasure item selected from the plurality of countermeasure item candidates displayed on the countermeasure item display device such that the countermeasure item is matched with the abnormality identification information;
instruct the countermeasure item transmitting device to transmit the abnormality identification information and the countermeasure item stored in the countermeasure item storing device to the outside via the communication device;
instruct the countermeasure item statistic receiving device to receive the statistic regarding the countermeasure item corresponding to the abnormality identification information transmitted from the outside; and
instruct the countermeasure item statistic display device to display the statistic regarding the countermeasure item for the abnormality identification information received by the countermeasure item statistic receiving device when the abnormality occurs.

* * * * *